US009254693B2

(12) United States Patent
Maeda

(10) Patent No.: US 9,254,693 B2
(45) Date of Patent: Feb. 9, 2016

(54) PRINT CONTROL APPARATUS, PRINT CONTROL METHOD, AND STORAGE MEDIUM

(71) Applicant: CANON KABUSHIKI KAISHA, Tokyo (JP)

(72) Inventor: Masao Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/314,986

(22) Filed: Jun. 25, 2014

(65) Prior Publication Data

US 2015/0002862 A1 Jan. 1, 2015

(30) Foreign Application Priority Data

Jun. 28, 2013 (JP) ................................. 2013-137041

(51) Int. Cl.

*G06K 15/02* (2006.01)
*G06K 15/00* (2006.01)
*B41J 11/00* (2006.01)

(52) U.S. Cl.

CPC ............ *B41J 11/0095* (2013.01); *B41J 11/008* (2013.01)

(58) Field of Classification Search

CPC .................. B65H 2220/01; G03G 2215/00734
USPC ..................... 358/1.2, 1.16; 271/9.01; 347/16
See application file for complete search history.

(56) References Cited

U.S. PATENT DOCUMENTS

2003/0230842 A1* 12/2003 Shiho et al. .................. 271/9.01
2006/0033795 A1* 2/2006 Yokoi ........................... 347/104
2007/0025752 A1* 2/2007 Maeda et al. ................... 399/81
2010/0111546 A1* 5/2010 Kubo ................. G03G 15/6508 399/16
2012/0307268 A1* 12/2012 Miller et al. .................. 358/1.9

FOREIGN PATENT DOCUMENTS

JP 11-155043 A 6/1999

* cited by examiner

*Primary Examiner* — Thomas Lett
(74) *Attorney, Agent, or Firm* — Canon USA, Inc. I.P. Division

(57) ABSTRACT

If a print medium size is set as a print setting for print target data, a print control apparatus causes a printing unit to print an image with a size corresponding to the print medium size based on the print target data. If the print medium size is not set as the print setting, the print control apparatus causes the printing unit to print an image with a size corresponding to a candidate print medium size obtained by a sensor detecting the size of the print medium.

24 Claims, 10 Drawing Sheets

FIG.4A

| | | | |
|---|---|---|---|
| PAPER SIZE | PAPER WIDTH | PAPER LENGTH | ASPECT RATIO |
| Photo L | 89.0 | 127.0 | 1.43 |
| Envelope You #6 | 98.0 | 190.0 | 1.94 |
| Postcard | 100.0 | 148.0 | 1.48 |
| Photo 4×6 | 101.6 | 152.4 | 1.50 |
| Envelope Chou #3 | 120.0 | 235.0 | 1.96 |
| Photo 2L | 127.0 | 178.0 | 1.40 |
| Double Postcard | 200.0 | 148.0 | 0.74 |
| Photo 6P | 203.2 | 254.0 | 1.25 |
| A4 | 210.0 | 297.0 | 1.41 |
| Letter | 215.9 | 279.4 | 1.29 |
| 300 | 301 | 302 | 303 |

FIG.4B

| | | | | PAPER SIZES SIMILAR IN SIZE | | | | | | | | | |
|---|---|---|---|---|---|---|---|---|---|---|---|---|---|
| PAPER SIZE | PAPER WIDTH | PAPER LENGTH | ASPECT RATIO | Photo L | Envelope You #6 | Postcard | Photo 4×6 | Envelope Chou #3 | Photo 2L | Double Postcard | Photo 6P | A4 | Letter |
| Photo L | 89.0 | 127.0 | 1.43 | – | | | | | | | | | |
| Envelope You #6 | 98.0 | 190.0 | 1.94 | | – | × | × | | | | | | |
| Postcard | 100.0 | 148.0 | 1.48 | | × | – | × | | | | | | |
| Photo 4×6 | 101.6 | 152.4 | 1.50 | | × | × | – | | | | | | |
| Envelope Chou #3 | 120.0 | 235.0 | 1.96 | | | | | – | | | | | |
| Photo 2L | 127.0 | 178.0 | 1.40 | | | | | | – | | | | |
| Double Postcard | 200.0 | 148.0 | 0.74 | | | | | | | – | × | × | × |
| Photo 6P | 203.2 | 254.0 | 1.25 | | | | | | | × | – | × | × |
| A4 | 210.0 | 297.0 | 1.41 | | | | | | | × | × | – | × |
| Letter | 215.9 | 279.4 | 1.29 | | | | | | | × | × | × | – |

300 301 302 303 304

WHEN LETTER IS SPECIFIED AND LETTER PAPER IS SET

WHEN LETTER IS SPECIFIED AND A4 PAPER IS SET

WHEN A4 IS SPECIFIED AND LETTER PAPER IS SET

WHEN A4 IS SPECIFIED AND A4 PAPER IS SET

WHEN A4 AND BORDERLESS PRINTING ARE SPECIFIED AND LETTER PAPER IS SET

WHEN A4 AND BORDERLESS PRINTING ARE SPECIFIED AND A4 PAPER IS SET

PRINT CONTROL APPARATUS, PRINT CONTROL METHOD, AND STORAGE MEDIUM

BACKGROUND

1. Field of the Disclosure

Aspects of the present invention generally relate to a print control apparatus, a print control method, and a storage medium each of which causes an image to be printed based on print target data.

2. Description of the Related Art

There are known techniques in which, when a printing apparatus performs printing, a paper width sensor included in the printing apparatus detects the width of printing paper for use in printing and the printing apparatus scales a print target image in such a way as to fit the paper width detected by the paper width sensor.

As one of techniques to dispense with a user operation for selecting the paper size, Japanese Patent Application Laid-Open No. 11-155043 discusses a technique to detect the width of printing paper via a sensor and to scale print data in such a way as to fit the detected paper width for printing.

In the technique discussed in Japanese Patent Application Laid-Open No. 11-155043, a print target image is inevitably scaled (enlarged or reduced) based on the paper width information detected by the sensor. Therefore, when printing paper, the size of which is greatly different from the size of printing paper to be used for printing, is set in the printing apparatus, appropriate printing may not be performed.

For example, in the technique discussed in Japanese Patent Application Laid-Open No. 11-155043, even if the size of printing paper is set by the user as one of the print settings about the print target data, an image may be scaled according to a result of detection of the paper width by the sensor irrespective of the set size of printing paper. Accordingly, when printing paper, the size of which is greatly different from the size of printing paper set as one of the print settings, is set in the printing apparatus, an image with an inappropriate size may be printed.

SUMMARY

Aspects of the present invention relate to a print control apparatus, a print control method, and a storage medium each of which is capable of causing an image with an appropriate size to be printed.

According to an aspect of the present invention, an apparatus includes an acquisition unit configured to acquire a candidate size of a print medium, the candidate size being obtained by a sensor detecting the size of the print medium, a determination unit configured to determine whether a print medium size is set as a print setting for print target data, and a print control unit configured to, if the determination unit determines that the print medium size is set as the print setting, cause a printing unit to print an image with a size corresponding to the print medium size based on the print target data, and, if the determination unit does not determine that the print medium size is set as the print setting, cause the printing unit to print an image with a size corresponding to the candidate size acquired by the acquisition unit based on the print target data.

Further features of the present invention will become apparent from the following description of exemplary embodiments with reference to the attached drawings.

BRIEF DESCRIPTION OF THE DRAWINGS

FIGS. 4A and 4B illustrate paper size tables according to the exemplary embodiment.

DESCRIPTION OF THE EMBODIMENTS

Various exemplary embodiments, features, and aspects of the invention will be described in detail below with reference to the drawings.

Figure 1:
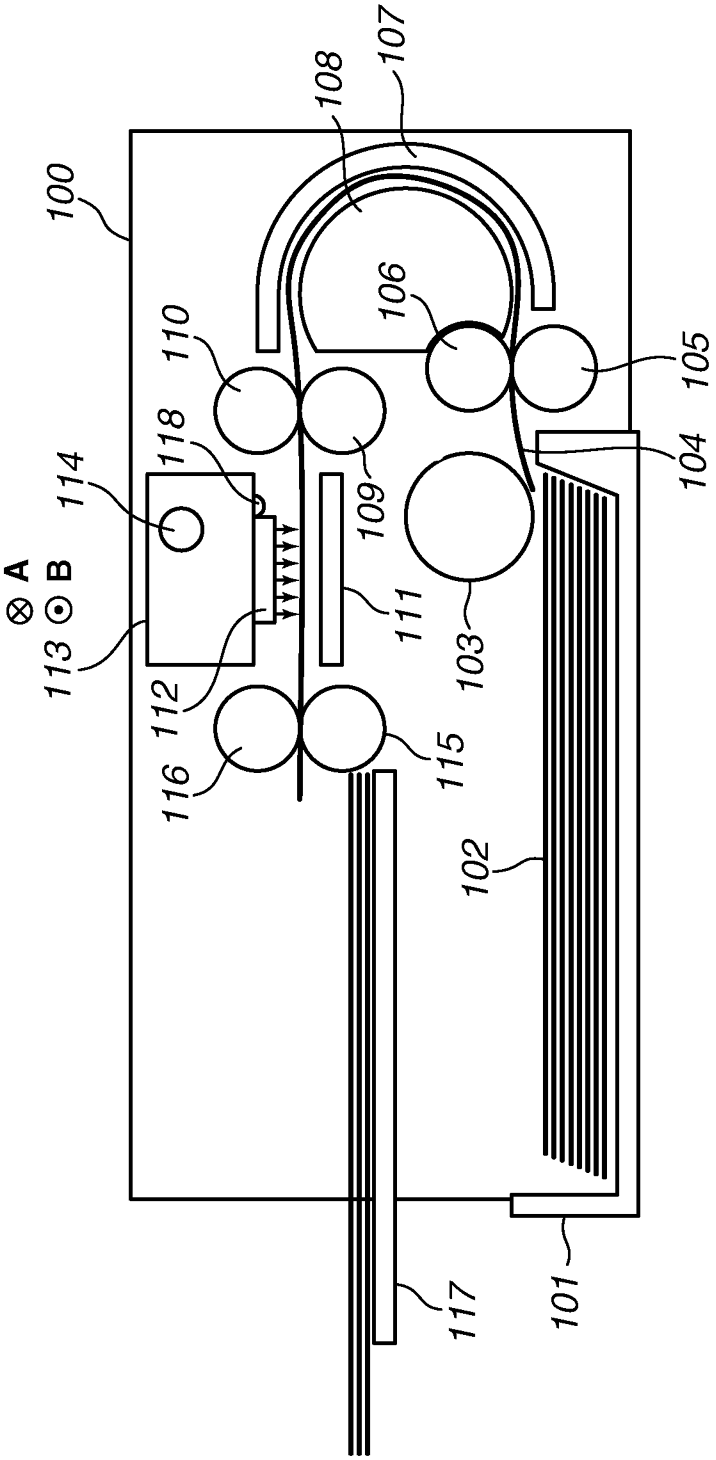
FIG. 1 is a schematic sectional view illustrating a printing mechanism included in a printing apparatus according to an exemplary embodiment.

FIG. 1 is a schematic sectional view illustrating a printing mechanism included in a printing apparatus 100 according to an exemplary embodiment. Printing paper 102 is stored in a paper feed tray 101. A paper feed roller 103 feeds printing paper stored in the paper feed tray 101 to conveyance rollers 105 and 106. Printing paper 104 is a sheet that has been fed by the paper feed roller 103 and is being transported by the conveyance rollers 105 and 106. As illustrated in FIG. 1, the printing paper 104 is conveyed by the conveyance rollers 105 and 106 to conveyance rollers 109 and 110 via a conveyance path, which is formed by members 107 and 108. The conveyance rollers 109 and 110 convey the printing paper 104 to a platen 111.

A carriage 113, to which a print head 112 is mounted, is arranged above the platen 111. The carriage 113 reciprocates in the direction A (from the near side to the far side in FIG. 1) and the direction B (from the far side to the near side in FIG. 1) illustrated in FIG. 1 along a guide rail 114. The printing apparatus 100 applies drive pulses to the print head 112 to cause the print head 112 to discharge a recording agent, such as ink, onto the printing paper 104, while moving the carriage 113 in the direction A and the direction B. With the recording agent being discharged from the print head 112 to the recording paper 104, a print target image can be printed on the recording paper 104. The recording paper 104, on which an image has been printed, is conveyed by the conveyance rollers 109 and 110 to discharge rollers 115 and 116. The discharge rollers 115 and 116 discharge the printing paper 104 to a discharge tray 117.

A paper sensor 118, which is a reflection-type optical sensor, is mounted to the carriage 113. The printing apparatus 100 acquires an output level (output voltage) indicating the intensity of light received by the paper sensor 118 and determines whether the output level is a level corresponding to reflected light from the printing paper, thus detecting whether the printing paper is present at a position where the reflected light is received by the paper sensor 118. The paper sensor 118 is mounted to the carriage 113 as described above, and is thus movable together with the print head 112. The printing apparatus 100 detects whether the printing paper 104 is present in a range in which the paper sensor 118 is moved, and thus determines edge portions of the printing paper in the range of movement of the paper sensor 118. Then, the printing apparatus 100 detects the width of the printing paper based on a distance between the right-hand and left-hand edge portions of the printing paper. The details of processing for detecting the width of the printing paper are described below with reference to FIG. 2. The movement position of the paper sensor 118 (the carriage 113) is detected by an encoder 224, to be described below.

The printing mechanism of the printing apparatus 100 includes the paper feed tray 101, the platen 111, the print head 112, the carriage 113, the guide rail 114, the discharge tray 117, and the above-mentioned various rollers.

Figure 2:
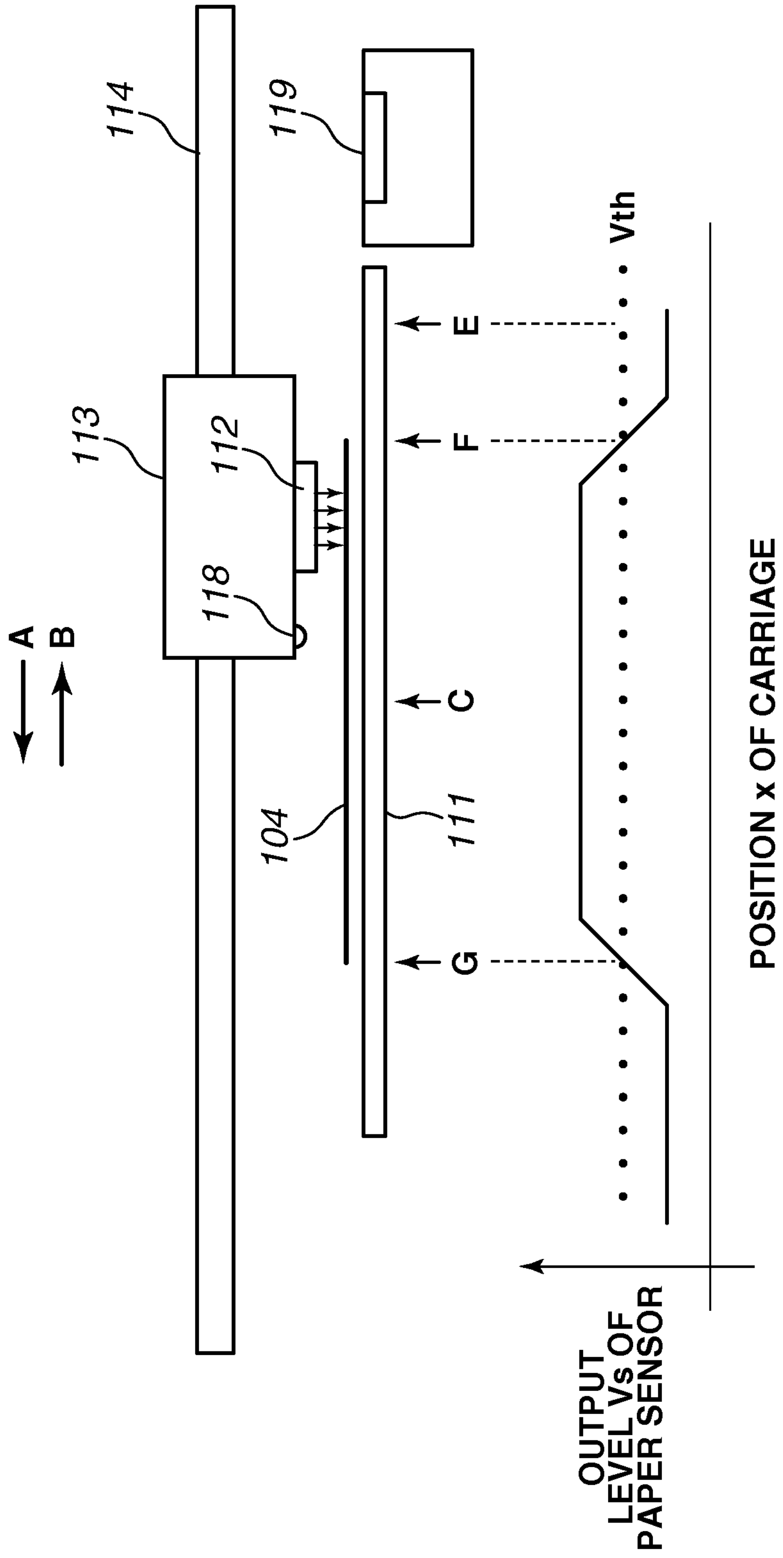
FIG. 2 is a schematic diagram illustrating a manner in which a paper sensor detects the width of paper (paper width).

FIG. 2 is a schematic diagram illustrating a manner in which the paper sensor 118 detects the width of paper (paper width).

The printing apparatus 100 prints an image on the printing paper 104, as described above, by causing the print head 112 to discharge a recording agent while moving the carriage 113 along the guide rail 114 in the direction A and the direction B. A head recovery mechanism 119, which performs capping of the print head 112, is arranged in a position outside the platen 111 in the movement range of the carriage 113 (the position x of the paper sensor 118). The position x of the paper sensor 118 can be identified by the position of the carriage 113 detected by the encoder 224, to be described below.

The paper sensor 118 receives light while moving above the platen 111 and detects an output level of the received light. The graph illustrated in FIG. 2 indicates an output level Vs detected by the paper sensor 118 in the movement range of the carriage 113. In the present exemplary embodiment, the printing paper is in a bright color, such as white, and the platen 111 is in a dark color, such as black. Accordingly, a high output level (strong reflected light from the printing paper) can be detected in a position where the printing paper is present on the platen 111, and a low output level (weak reflected light from the printing paper) can be detected in a position where the printing paper is not present on the platen 111.

The paper sensor 118 receives reflected light in a position E on the platen 111 when the carriage 113 is located in a position above the head recovery mechanism 119. Then, when the carriage 113 moves in the direction A, the output level Vs increases in a position corresponding to an edge portion of the printing paper 104. Then, the output level Vs remains almost constant during a period when the carriage 113 moves from the edge portion of the printing paper 104 to the opposite edge portion thereof. The output level Vs then decreases in a position corresponding to the opposite edge portion of the printing paper 104.

In the present exemplary embodiment, when the output level Vs of the paper sensor 118 exceeds a predetermined threshold value Vth, the printing apparatus 100 determines that the printing paper 104 is present in a position where the output level Vs has been detected. More specifically, the printing apparatus 100 determines the positions G and F in FIG. 2 as the positions of the respective edges of the printing paper 104, and determines the range from the position G to the position F as a range in which the printing paper is present. Then, the printing apparatus 100 detects the distance between the position G and the position F as the paper width of the printing paper 104.

In the present exemplary embodiment, the printing apparatus 100 conveys the printing paper 104 in a centering manner such that the central line of the printing paper 104 passes through the middle position C of the platen 111. At this time, if the printing paper 104 is so large that the right-hand edge of the printing paper 104 is located on the right side of the position E in FIG. 2, the printing apparatus 100 may not be able to detect the position of the right-hand edge of the printing paper 104.

Therefore, in the present exemplary embodiment, in a case where the right-hand edge of the printing paper 104 is located on the right side of the position E, the printing apparatus 100 determines the paper width of the printing paper 104 based on the distance between the middle position C and the position G of the left-hand edge of the printing paper 104. More specifically, if the output level Vs in the position E exceeds the threshold value Vth, the printing apparatus 100 determines that the right-hand edge of the printing paper 104 is located in the position E or on the right side of the position E. In such a case, the printing apparatus 100 detects the length obtained by doubling the distance between the middle position C and the position G as the paper width of the printing paper 104. In other words, since the printing apparatus 100 conveys the printing paper 104 in such a manner the central line of the printing paper 104 passes through the middle position C, the distance between the middle position C and the position G of the left-hand edge of the printing paper 104 corresponds to half of the paper width of the printing paper 104. Therefore, the printing apparatus 100 can detect the length obtained by doubling the distance between the middle position C and the position G as the paper width. Since a value indicating the middle position C in the movement range of the carriage 113 is previously stored in a memory included in the printing apparatus 100, the printing apparatus 100 can refer to the stored value to obtain the distance between the middle position C and the position G.

The above-described threshold value Vth is not limited to a fixed value, but may be varied, for example, according to the output level Vs in the position E. Moreover, the threshold value Vth may be determined according to the intensity of reflected light due to the surface characteristics of a print medium. More specifically, the threshold value Vth may be varied according to the type of paper usable for printing, such as plain paper and glossy paper. Furthermore, the printing apparatus 100 may detect the presence or absence of printing paper based on a result of comparison between the output level Vs in the position E and the output level Vs in another position, instead of determining whether the output level Vs exceeds the threshold value Vth. For example, in a case where the printing apparatus 100 determines that the printing paper is not present in the position E based on the output level Vs in the position E, the printing apparatus 100 may determine that the printing paper is present in a position where an output level Vs that is larger than the output level Vs in the position E by a predetermined value or more is detected.

In addition, in the example illustrated in FIG. 2, the paper sensor 118, which is mounted to the carriage 113, performs detection while moving together with the carriage 113. However, this is not a restrictive one. For example, paper sensors may be mounted on the platen 111 separately from the carriage 113. In this case, sensors the number of which corresponds to the width of a conveyance path for printing paper are aligned and arranged on the platen 111, and each paper sensor detects whether the printing paper is present, thus enabling detection of the width of the printing paper.

Figure 3:
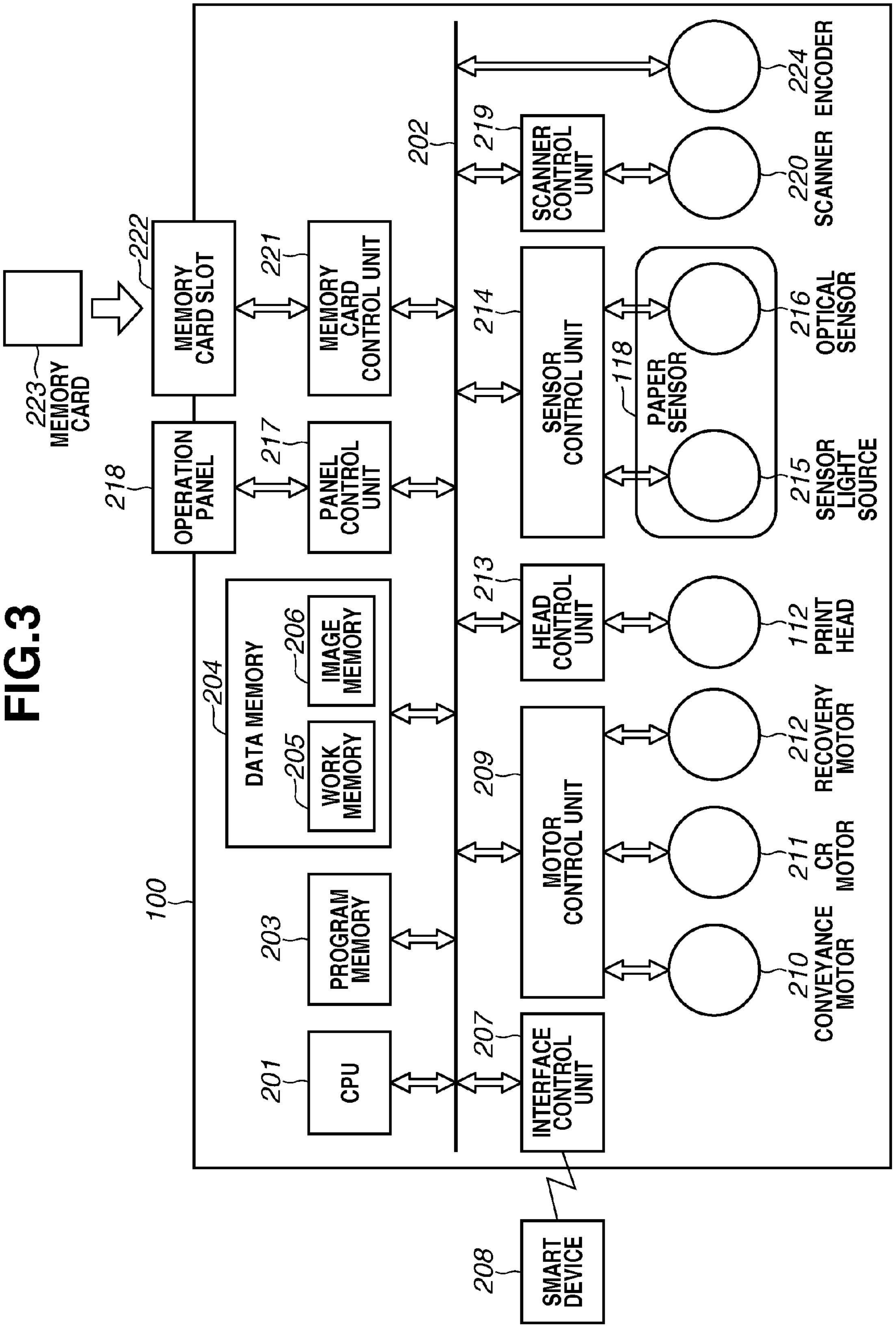
FIG. 3 is a block diagram illustrating a configuration of the printing apparatus.

Next, a configuration of the printing apparatus 100 is described. FIG. 3 is a block diagram illustrating the configuration of the printing apparatus 100.

A CPU 201 is a processor that controls the printing apparatus 100. The CPU 201 is connected to a program memory 203, such as a read-only memory (ROM) or a hard disk, and a data memory 204, such as a random access memory (RAM), via an internal bus 202. The program memory 203 stores a program for controlling the printing apparatus 100. The CPU 201 can control the printing apparatus 100 by reading out the program stored in the program memory 203 to the data memory 204 and executing the program on a work memory 205, which is allocated to the data memory 204. An image memory 206 is also allocated to the data memory 204. The CPU 206 loads, on the image memory 206, various typed of data, including image data to be printed by the printing apparatus 100.

An interface control unit 207 communicates with a smart device 208, such as a smartphone, via an interface under the control of the CPU 201. For example, the interface control unit 207 can receive a print target job from the smart device 208 and notify the smart device 208 of status information of the printing apparatus 100. In addition, the interface control unit 207 may perform communication via a wired interface, such as a universal serial bus (USB) cable. Also, the interface control unit 207 may perform communication via a wireless interface, such as infrared communication or a wireless local area network (LAN). The smart device 208 is, for example, a smartphone or a tablet, and includes various types of devices, such as mobile phones.

The partner with which the printing apparatus 100 communicates is not limited to the smart device 208, but may be a personal computer, a server connected via a network, an apparatus connected via telephone lines, such as a facsimile apparatus, or a digital television set. Furthermore, the present exemplary embodiment not only applies to the case where print target data is included in a print job, but also applies the case where the printing apparatus 100 acquires print target data from an external apparatus, such as a server, based on address information included in the print job.

A motor control unit 209 controls various motors for driving the printing mechanism of the printing apparatus 100 under the control of the CPU 201. A conveyance motor 210 drives the paper feed roller 103, the conveyance rollers 105, 106, 109, and 110, and the discharge rollers 115 and 116 under the control of the motor control unit 209. A carriage motor (CR motor) 211 drives the carriage 113 under the control of the motor control unit 209 to reciprocate the carriage 113. A recovery motor 212 drives the head recovery mechanism 119 under the control of the motor control unit 209.

A head control unit 213 controls the print head 112 under the control of the CPU 201 to cause the print head 112 to discharge a recording agent, such as ink. The CPU 201 drives both the print head 112 and the conveyance motor 210 to cause the print head 112 to print an image on printing paper while moving. Thus, the CPU 201 included in the printing apparatus 100 serves as a print control apparatus, which controls the printing mechanism, including the various motors and the print head 112, to print an image.

A sensor control unit 214 causes, under the control of the CPU 201, a sensor light source 215 included in the paper sensor 118 to emit light and an optical sensor 216 included in the paper sensor 118 to receive reflected light. The sensor control unit 214 acquires an output level indicating the intensity of light received by the optical sensor 216. The CPU 201 acquires the output level acquired by the sensor control unit 214 to determine the paper width as illustrated in FIG. 2. Then, the CPU 201 performs processing, to be described below, to determine paper size, including paper length, based on the determined paper width.

A panel control unit 217 controls an operation panel 218 under the control of the CPU 201. The operation panel 218 includes an operation device operable by the user, such as a key bad or touch panel, and a display panel capable of displaying various types of information, such as images. For example, when the user operates the operation device of the operation panel 218, an instruction from the user is input to the panel control unit 217 and is then input to the CPU 201. The panel control unit 217 displays, on the display panel of the operation panel 218, an image loaded on the image memory 206 in response to an instruction from the CPU 201.

A scanner control unit 219 controls a scanner 220 under the control of the CPU 201 to cause the scanner 220 to read a document placed on a document positioning board of the scanner 220, and receives the read image from the scanner 220. Then, the scanner control unit 219 stores the received image into the image memory 206. A memory card control unit 221 writes and reads various types of data in and from a memory card 223 connected to a memory card slot 222.

An encoder 224 is used to identify the position of the carriage 113 when the carriage 113 moves along the guide rail 114. The CPU 201 identifies the position x of the carriage 113, illustrated in FIG. 2, based on the position of the carriage 113 identified via the encoder 224 and the mounting position of the paper sensor 118 on the carriage 113.

In the present exemplary embodiment, the CPU 201 determines the paper size, including the paper length, based on the paper width determined by the paper sensor 118 as described above. In the printing apparatus 100 according to the present exemplary embodiment, the paper sensor 118 as well as the print head 112 is mounted to the carriage 113. In addition, various motors for moving the carriage 113, the guide rail 114, and members for identifying the position of the carriage 113, such as the encoder 224, are used in common for both printing by the print head 112 and detection of the paper width via the paper sensor 118. Therefore, it is not necessary to provide such members for detection of the paper width separately for the members for printing, so that the printing apparatus 100 can be prevented from increasing in size.

FIGS. 4A and 4B illustrate paper size tables according to the present exemplary embodiment. The paper size table illustrated in FIG. 4A lists paper size 300 of printing paper usable in the printing apparatus 100 and paper width 301, paper length 302, and aspect ratio (vertical-to-horizontal ratio) 303 of the paper size. The unit of each of paper width 301 and paper length 302 is millimeter (mm).

The paper size table is stored in the program memory 203. The CPU 201 can refer to the paper size table by reading out the paper size table from the program memory 203 to the data memory 204. The present exemplary embodiment is not limited to a case where information of the paper width 301 is retained in a table format, but the present exemplary embodiment can adopt various methods for storing information of the paper width 301 in association with the paper size.

In the present exemplary embodiment, the CPU 201 determines the size of printing paper based on the paper width detected by the paper sensor 118. More specifically, the CPU 201 identifies, as the size of printing paper 104 conveyed in the printing apparatus 100, the paper size 300 having the paper width 301 that is within a predetermined range including the paper width detected by the paper sensor 118 in the paper size table. The reason for providing the predetermined range is that, since the intensity of reflected light from the printing paper varies depending on the state of the printing paper or the environment where the printing apparatus 100 is placed, an error may occur between a result of detection by the paper sensor 118 and the actual paper width.

Therefore, for example, the predetermined range is set to a range from 3 mm above the detected paper width to 3 mm below the detected paper width. When "126.0 mm" is detected as the paper width by the paper sensor 118, the CPU 201 specifies, as a candidate size of printing paper, the paper size 300 corresponding to the paper width 301 included in a range from 123.0 mm to 129.0 mm. In this case, as indicated in the paper size table illustrated in FIG. 4A, Photo 2L, which corresponds to the paper width 301 (127.0 mm), is specified as a candidate paper size.

Furthermore, the paper size may not be necessarily uniquely specified, and a plurality of paper sizes that is similar in paper width may be specified as candidate sizes of the print medium. For example, when "99.0 mm" is detected as the paper width by the paper sensor 118, Envelope You #6 (paper width: 98.0 mm), Postcard (paper width: 100.0 mm), and Photo 4×6 (paper width: 101.6 mm) are included in a paper width range from 96.0 mm to 102.0 mm. Similarly, when "213.0 mm" is detected as the paper width, A4 size (paper width: 210.0 mm) and Letter (paper width: 215.9 mm) are specified as candidate paper sizes.

In the present exemplary embodiment, in a case where the size of printing paper is set as one of print settings, the CPU 201 determines whether the size of printing paper specified by the user is included in one or more candidate paper sizes specified via the paper sensor 118. Then, if the size of printing paper specified by the user is included in one or more candidate paper sizes, the CPU 201 causes an image with a size corresponding to the specified size to be printed on the printing paper.

If the size of printing paper specified by the user is not included in any candidate paper sizes, the CPU 201 causes an image with a size corresponding to a candidate paper size to be printed on the printing paper or restricts printing.

Accordingly, for example, if the user erroneously specifies a size that is greatly different from the size of printing paper used for printing, or if printing paper with a size that is greatly different from the size specified by the user is conveyed, the printing apparatus 100 can perform appropriate print processing. More specifically, in such a case, the printing apparatus 100 can prevent an image with a size that is greatly different from the size of printing paper from being printed. The details of the above-described processing are described below with reference to FIGS. 6A and 6B.

The above-mentioned print settings can be set by a user's instruction issued, for example, in a host computer or a smart device, which is an apparatus that transmits a print job to the printing apparatus 100. More specifically, a display screen usable for the user to issue an instruction about settings for the size of printing paper, the type of printing paper, and page margins provided on printing paper for printing is displayed by a host computer or a smart device. For example, the user can specify print settings on the display screen after selecting print target data, thus issuing an instruction about the print settings for printing of the print target data. Then, print setting information indicating the print settings specified by the user is transmitted from the host computer or the smart device to the printing apparatus 100. Incidentally, a print job containing the print setting information and the print target data may be transmitted to the printing apparatus 100, or the print setting information and the print target data may be separately transmitted to the printing apparatus 100. Moreover, the print setting information including the set paper size may be transmitted as a single file, such as a Digital Print Order Format (DPOF) file, to the printing apparatus 100 separately from a file including the print target data.

As described with reference to FIG. 2, in the present exemplary embodiment, in a case where the printing paper 104 is large, one edge of the printing paper 104 may not be detected by the paper sensor 118. At this time, the paper width is determined by calculation based on a distance between the middle position C and the position G. In this case, for example, depending on the characteristics of the printing paper 104, the printing paper 104 may be conveyed with the center line of the printing paper 104 deviating from the middle position C. Therefore, in a case where one edge of the printing paper 104 is not detected, the above-described predetermined range can be set to a relatively wide range, such as ±10 mm, instead of ±3 mm. In this case, for example, when "210 mm" is detected as the paper width, Double Postcard (paper width: 200.0 mm), Photo 6P (paper width: 203.2 mm), A4 size (paper width: 201.0 mm), and Letter (paper width: 215.9 mm) are specified as candidate paper sizes.

Furthermore, in the above-described example, the CPU 201 specifies a paper size or paper sizes included in a predetermined range (for example, ±3 mm) centering around the paper width detected by the paper sensor 118. However, this is not a restrictive one. The CPU 201 can specify a paper size or paper sizes included in a range from the detected paper width to a width larger than the detected paper width by a predetermined width (for example, +3 mm), or, conversely, can specify a paper size or paper sizes included in a range from the detected paper width to a width smaller than the detected paper width by a predetermined width. Moreover, the predetermined range can be varied depending on the type of printing paper (plain paper or glossy paper). For example, in a case where the printing paper is glossy paper, the intensity of reflected light is larger than in a case where the printing paper is plain paper. At this time, the output level Vs acquired by the paper sensor 118 in a position where the printing paper is not really present may exceed the above-described threshold value Vth, thus causing an erroneous determination that the printing paper is present in that position. Therefore, for example, in a case where the printing paper is plain paper, a range of ±3 mm can be set, and in a case where the printing paper is glossy paper, a range of ±6 mm can be set. In addition, the predetermined range can be set according to various conditions, such as the characteristics of the paper sensor 118.

Furthermore, in the above-described example, the paper size is determined based on the paper size table illustrated in FIG. 4A. However, as another example, the paper size can be determined based on a paper size table illustrated in FIG. 4B.

The paper size table illustrated in FIG. 4B further includes paper information 304, which indicates paper sizes similar in paper width, in addition to the paper size table illustrated in FIG. 4A. More specifically, paper size with mark "x" in the table is similar, in paper width, to paper size corresponding to the paper size with mark "x". For example, the paper size table indicates that A4 size and Letter size are similar in paper width. Also, the paper size table indicates that Envelope You #6, Postcard, and Photo 4×6 are similar in paper width.

The CPU 201 can refer to the paper width 301 by reading out the paper size table illustrated in FIG. 4B from the program memory 203 to the data memory 204. Then, when the paper width is detected by the paper sensor 118, the CPU 201 specifies paper size corresponding to the detected paper width. Further, if paper size similar in paper width to the specified paper size is indicated in the paper size table, the CPU 201 specifies a plurality of candidate paper sizes, including the paper size similar in paper width.

For example, when the paper width detected by the paper sensor 118 is 90.00 mm, the CPU 201 uniquely specifies Photo L as paper size. On the other hand, when the paper width detected by the paper sensor 118 is 99.00 mm, the CPU 201 specifies Postcard size, which is most similar to the detected paper width, as paper size, and further specifies Envelope You #6 and Photo 4×6, which are indicated in the paper information 304, in addition to Postcard.

In the above-described way, the CPU 201 determines the paper size of printing paper, including the paper length 302 in addition to the paper width 301, based on the paper size table illustrated in FIG. 4A or 4B. Then, the CPU 201 performs print processing according to the determined paper size.

Furthermore, the CPU 201 can set an optional paper size as paper size for printing, other than the paper sizes (typical sizes) indicated in the paper size tables illustrated in FIGS. 4A and 4B. More specifically, the CPU 201 can set the paper width and the paper length as paper size in units of millimeter (mm) and scales a print target image according to the set paper width and paper length, thus printing an image with a size corresponding to the set paper size on the printing paper.

Figure 5:
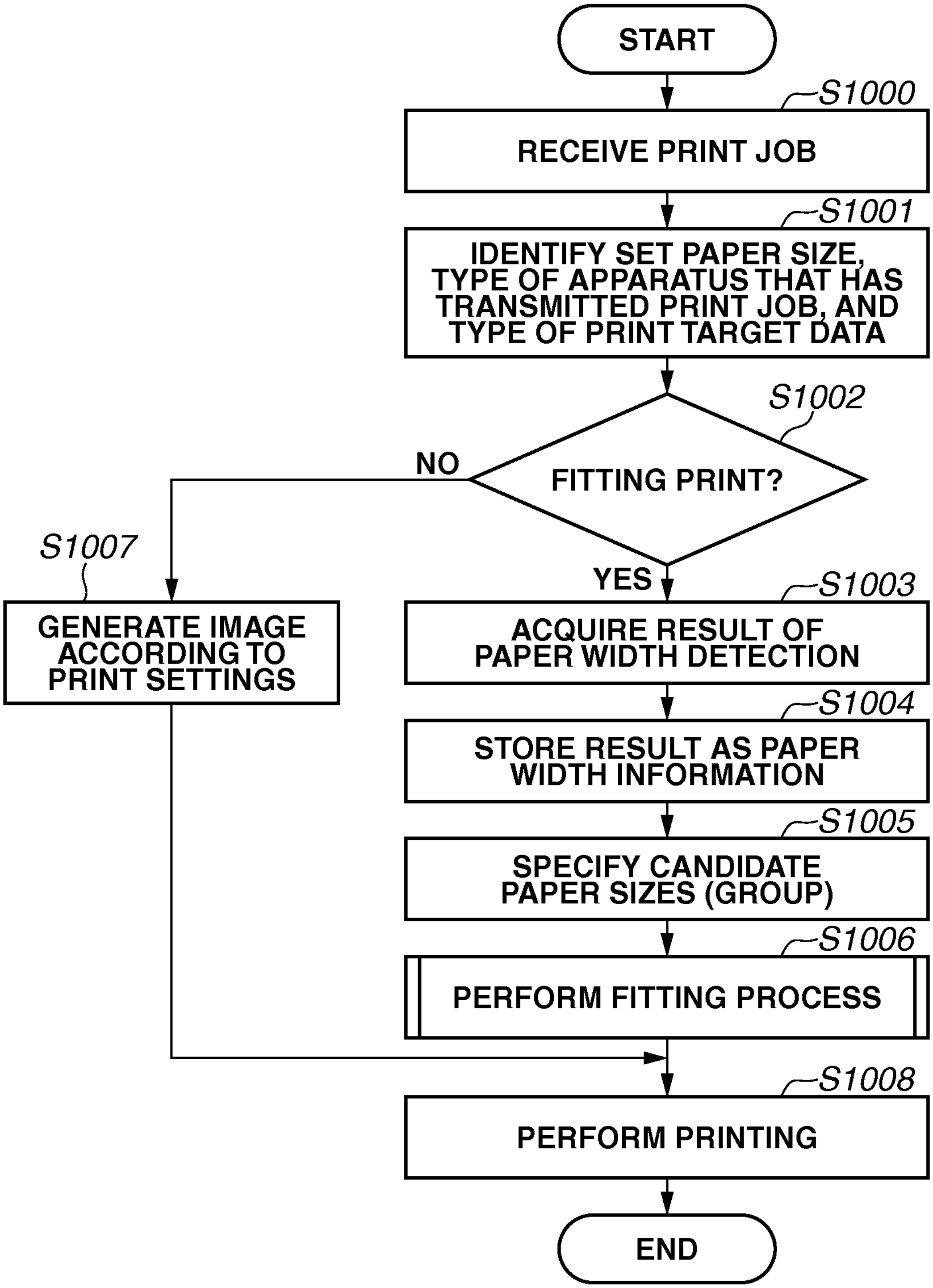
FIG. 5 is a flowchart illustrating an example of print control processing performed by a central processing unit (CPU).

FIG. 5 is a flowchart illustrating an example of print control processing performed by the CPU 201. A program corresponding to the print control processing illustrated in the flowchart of FIG. 5 is stored in the program memory 203. The CPU 201 reads out the program to the work memory 205 and executes the program on the work memory 205 to implement processing in each step of the flowchart of FIG. 5.

In step S1000, the CPU 201 receives a print job from an external apparatus via the interface control unit 207, and stores the print job in the data memory 204. The print job includes data, such as an image, to be printed by the printing apparatus 100 (print target data) and print setting information indicating print settings about a printing paper type and a printing paper size to be used for printing the data.

After receiving the print job in step S1000, in step S1001, the CPU 201 identifies the paper size set in the print settings, the type of an apparatus that has transmitted the print job, and the type of print target data included in the print job.

More specifically, in step S1001, the CPU 201 analyzes the print setting information included in the print job received in step S1000. Then, the CPU 201 identifies the set size of printing paper (set paper size), which is set for the print target data corresponding to the print job, in the print setting information. The set paper size in the print setting information is set by the apparatus (a server, a host computer, a smart device, or the like) that has transmitted the print job, which has been received in step S1000. For example, when the user of the apparatus specifies a printing paper size on a screen of the apparatus, size information indicating the printing paper size is registered as the set paper size in the print setting information. Then, in step S1001, the CPU 201 receives a print job including the print setting information and identifies the printing paper size, which has been set in such a way.

The print setting information is included in the print job as information separate from the print target data in the print job. Thus, the information indicating the set paper size is also included in the print job separately from the print target data. Furthermore, print setting information including the set paper size can be transmitted to the printing apparatus 100 as a single file, such as a Digital Print Order Format (DPOF) file. In other words, the print setting information can be transmitted to the printing apparatus 100 as a file separate from the print target data, such as a Joint Photographic Experts Group (JPEG) file.

However, setting information about the printing paper size may be or may not be included in the print setting information depending on an apparatus that has transmitted the print job, which has been received in step S1000, or an application that has issued a printing instruction for the print job. In step S1001, only in a case where the setting information about the printing paper size is included in the print setting information, the CPU 201 identifies the size indicated by the setting information as the above-mentioned set paper size.

Moreover, the CPU 201 can determine the type of the external apparatus based on a protocol used for communication to receive the print job from the external apparatus or based on information, received from the external apparatus, indicating the type of the external apparatus. Also, the CPU 201 can determine the type of the print target data based on an extension of the file name of the print target data or based on information, received by the printing apparatus 100 from the apparatus that has transmitted the print job, indicating the type of the print target data.

In step S1002, the CPU 201 determines whether to perform a fitting print, in which printing is performed with the size of a print target image fitting to the size of printing paper stored in the printing apparatus 100, based on the type of the apparatus and the type of the print target data, which have been identified in step S1001. More specifically, the CPU 201 determines whether the type of the apparatus and the type of the print target data identified in step S1001 are respective predetermined types, and determines to perform the fitting print if it is determined that those are the respective predetermined types. For example, in a case where the printing apparatus 100 is able to receive a print job from a server, a host computer, or the smart device 208, the CPU 201 determines that the smart device 208 is an apparatus of the predetermined type and determines to perform the fitting print. In addition, the CPU 201 checks the file format of print target data and determines whether the file format is a predetermined file format. For example, the CPU 201 can set, as the predetermined types, an apparatus and a file format with which a photograph is likely to be selected as a print target, thus enabling surely performing the fitting print for photographs.

Formats of files printable by the printing apparatus 100 include the JPEG format, a predetermined raster file format, and Portable Document Format (PDF). The above-described predetermined type of the file format is, for example, the JPEG format or the predetermined raster file format. In step S1002, if the file format identified in step S1001 is the predetermined file format, the CPU 201 determines to perform the fitting print. On the other hand, if the file format identified in step S1001 is PDF, the CPU 201 determines not to perform the fitting print.

While, in step S1002, the CPU 201 determines whether to perform the fitting print based on both the type of the apparatus and the type of the print target data, the CPU 201 can make the determination based on either one of the types. For example, an image photographed by a photographing apparatus may be stored in a memory in the JPEG file format. Therefore, in step S1002, the CPU 201 can make such a determination as to perform the fitting print if the print target data is in the JPEG format.

Furthermore, various pieces of information can be used as a condition identified in step S1001 and used for the determination in step S1002. For example, the CPU 201 can determine to perform the fitting print if the print mode set for the printing apparatus 100 is a mode for performing the fitting print. In addition, in a case where the printing apparatus 100 is equipped with a plurality of interfaces, the CPU 201 can determine whether to perform the fitting print based on an interface that has been used for receiving the print job in step S1000. In a case where "equal size printing" is specified in the print setting information, the CPU 201 can determine not to perform the fitting print.

Moreover, the CPU 201 can determine to perform the fitting print in a case where, as another condition, the paper size is not specified in the print setting information included in the print job received in step S1000. The case where the paper size is not specified in the print setting information may be, for example, a case where information indicating the paper size is not included in the print setting information, or may be a case where information indicating the fitting print is included in the print setting information as the paper size information.

In addition, the CPU 201 can determine whether to perform the fitting print according to whether the user issues an instruction on the screen to perform the fitting print based on a result of detection of the paper width by the paper sensor 118. For example, in a case where the CPU 201 of the printing apparatus 100 displays on the operation panel 218 a screen including a checkbox for the above-mentioned instruction and the user checks the checkbox, the CPU 201 determines to perform the fitting print. Moreover, the CPU 201 can determine to perform the fitting print in a case where the above-mentioned screen is displayed on the external apparatus that has transmitted the print job and the user issues an instruction for the fitting print via the external apparatus. In this case, the external apparatus transmits, to the printing apparatus 100, the print job with information indicating the fitting print included therein or added thereto. In step S1002, the CPU 201 of the printing apparatus 100 determines whether to perform the fitting print according to whether the above-mentioned information has been received by the external apparatus. The above-mentioned screen to be displayed on the operation panel or the external apparatus is displayed in advance of printing, and the CPU 201 determines whether to perform the fitting print by checking the content, which has been specified by the user before printing, in step S1002 at the time of printing. Moreover, the CPU 201 can determine to perform the fitting print in a case where the above-mentioned screen is displayed at the time of printing and the user issues an instruction for the fitting print at the time of printing.

Furthermore, in a case where the above-mentioned instruction for the fitting print is not issued by the user, the CPU 203 can determine not to perform the fitting print irrespective of the type of the apparatus and the type of the print target data, which have been identified in step S1001. Thus, the CPU 201 can determine to perform the fitting print in a case where the above-mentioned instruction is issued by the user and the type of the apparatus and the type of the print target data are respective predetermined types.

If, in step S1002, the CPU 201 determines to perform the fitting print (YES in step S1002), processing operations in steps S1003 to S1006 are executed. On the other hand, if the CPU 201 does not determine to perform the fitting print (NO in step S1002), the processing proceeds to step S1007.

In step S1003, the CPU 201 drives the carriage 113 and the paper sensor 118 via the motor control unit 209 and the sensor control unit 214 to perform the paper width detection described with reference to FIG. 2. In step S1004, the CPU 201 acquires the paper width detected by the paper width detection in step S1003, and stores the paper width as paper width information in the work memory 205.

In step S1005, the CPU 201 refers to the paper width information stored in step S1004 and the paper size table illustrated in FIG. 4A or 4B, and specifies one or a plurality of paper sizes as candidate print medium sizes from among typical paper sizes supported by the printing apparatus 100. In this instance, as described above, a plurality of paper sizes may be extracted as candidate print medium sizes depending on the paper width information stored in step S1004. The CPU 201 stores the extracted paper sizes (group) as candidate paper size information in the work memory 205.

In step S1006, the CPU 201 performs a fitting process to generate, on the image memory 206, a print target image with a size fitting to the size of the print medium conveyed in the printing apparatus 100. The details of the fitting process are described below with reference to FIGS. 6A and 6B.

If the CPU 201 determines not to perform the fitting print (NO in step S1002), the processing proceeds to step S1007. In step S1007, the CPU 201 generates, on the image memory 206, a print target image according to the print settings specified by the print setting information. For example, in a case where a print target image is included in a print job and the print settings include "enlargement/reduction print" as a printing method and "A4 size" as printing paper size, the CPU 201 rasterizes image data and scales the rasterized image to a size fitting to A4 size. Also, in a case where the print settings include "equal size print" as a printing method, the CPU 201 generates a print target image without performing the above-mentioned scaling. In a case where the print settings include "borderless printing", the CPU 201 lays out a print target image in a layout area to which the printing paper size set in the print settings is enlarged at a borderless enlargement ratio.

For example, in a case where the file format identified in step S1001 is PDF, in step S1002, the CPU 201 determines not to perform the fitting print. In this case, the CPU 201 can set the paper size according to the page size set in a PDF file.

In the case of PDF files, page size information can be written into each page file. For example, an appropriate page size is written in pages of a PDF file. If the pages are fitted to a size other than the appropriate page size, printing may be performed on printing paper different in size from printing paper to be originally used for printing. Therefore, in a case where the file format identified in step S1001 is PDF, the CPU 201 determines not to perform the fitting print and, in step S1007, sets the page size set in the PDF file as printing paper size.

Also, in a case where the print target is a PDF file, the CPU 201 can perform the paper width detection via the paper sensor 118 in step S1007. In this case, the CPU 201 compares the width of the page size set in the PDF file with the paper width detected by the paper sensor 118. Then, if a difference between the widths is smaller than a predetermined width, the CPU 201 can perform printing with a size fitting to the page size, and, if the difference is equal to or larger than the predetermined width, the CPU 201 can display, on the operation panel 218, an error message usable for the user to confirm the printing paper size.

In step S1008, the CPU 201 outputs, to the head control unit 213, the print target image generated on the image memory 206 in step S1006 or S1007. Then, the CPU 201 drives the print head 112 and the carriage 113 to cause the print target image to be printed on the print medium.

Incidentally, when the CPU 201 generates a print target image in step S1006 or S1007, if the print target data is image data, such as a JPEG image file, the CPU 201 performs decompression processing to rasterize bitmap data on the image memory 206. If the print target data is vector data, the CPU 201 performs rendering processing in the image memory 206 to rasterize bitmap data on the image memory 206.

As described above, with the processing illustrated in the flowchart of FIG. 5, the printing apparatus 100 prints an image with a size corresponding to the print settings or a size determined as a result of detection by the paper sensor 118.

Figure 6A:
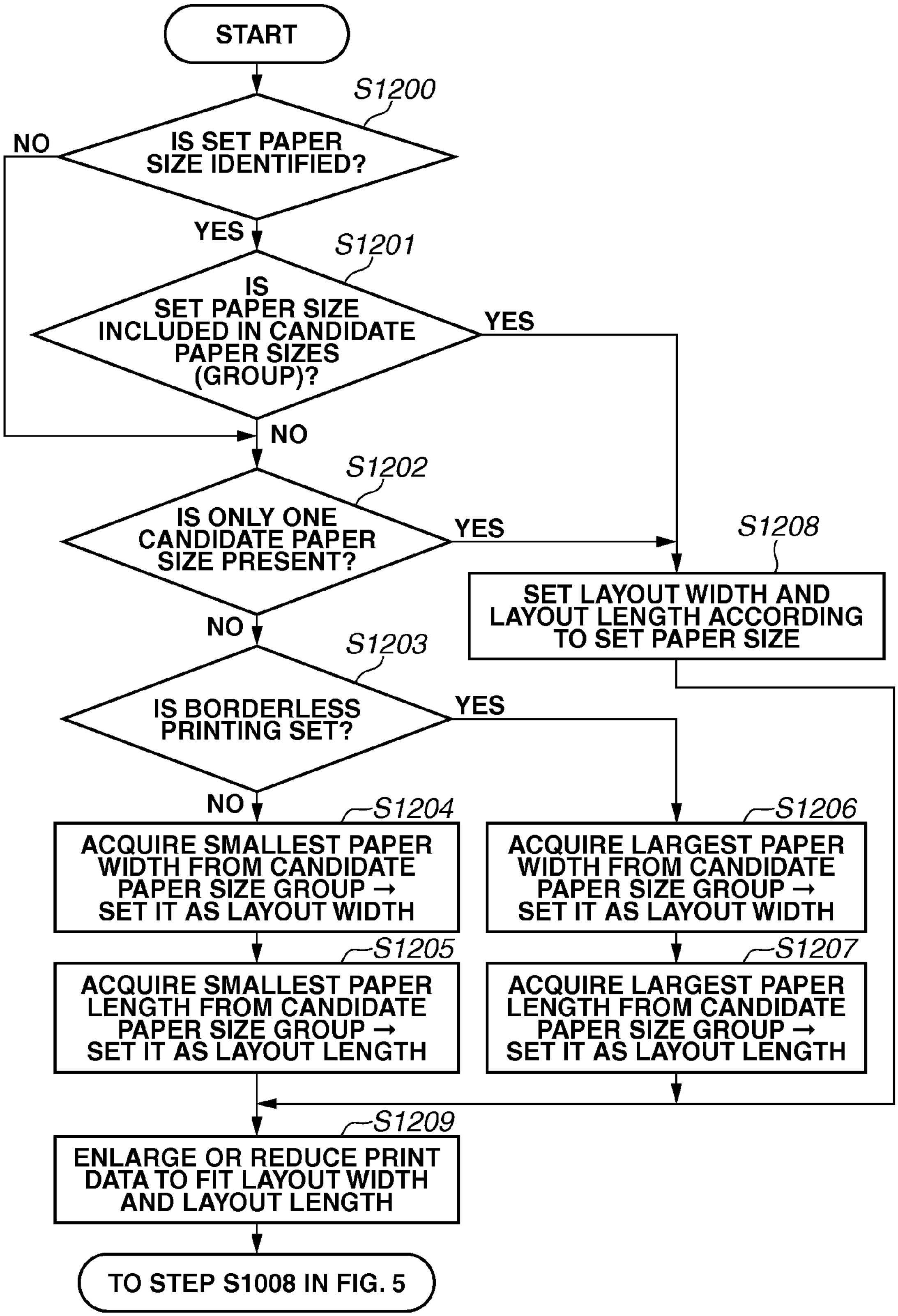
FIGS. 6A and 6B are flowcharts illustrating the details of a fitting process.

FIG. 6A is a flowchart illustrating the details of the fitting process in step S1006 illustrated in FIG. 5.

In step S1200 in FIG. 6A, the CPU 201 determines whether the set paper size has been identified in step S1001 in FIG. 5.

As described in step S1001, setting information indicating the printing paper size may be or may not be included in the print setting information depending on an apparatus that has transmitted the print job or an application that has issued a printing instruction for the print job. In step S1200, the CPU 201 determines whether the setting information indicating the printing paper size is included in the print setting information for the print job and the set paper size indicated by the setting information has been identified in step S1001.

If the CPU 201 determines that the set paper size has been identified in step S1001 (YES in step S1200), the processing proceeds to step S1201. If the CPU 201 determines that the set paper size has not been identified in step S1001 (NO in step S1200), the processing proceeds to step S1202.

In step S1201, the CPU 201 determines whether the set paper size identified in step S1001 is included in the candidate paper sizes (group) obtained in step S1005 based on the printing paper width detected by the paper sensor 118. If the CPU 201 determines that the set paper size is not included in the candidate paper size group (NO in step S1201), the processing proceeds to step S1202. On the other hand, if the CPU 201 determines that the set paper size is included in the candidate paper size group (YES in step S1201), the processing proceeds to step S1208. The details of step S1208 are described below.

In step S1202, the CPU 201 determines whether only one candidate printing paper size has been obtained in step S1005. If the CPU 201 determines that a plurality of candidate printing paper sizes has been obtained (NO in step S1202), the processing proceeds to step S1203. On the other hand, if the CPU 201 determines that only one candidate printing paper size has been obtained (YES in step S1202), the CPU 201 sets the candidate printing paper size as a printing paper size (set paper size) and the processing proceeds to step S1208. The details of step S1208 are described below.

In step S1203, the CPU 201 determines whether borderless printing is set as a margin setting for printing of the print job received in step S1000. Various conditions can be used to determine whether borderless printing is set. For example, the CPU 201 can determine that borderless printing is set in a case where the print mode of the printing apparatus 100 is a mode for performing borderless printing. In addition, the CPU 201 can determine that borderless printing is set in a case where borderless printing is specified in a margin setting, which is acquired from the print setting information included in the print job received from the smart device 208 in step S1000 illustrated in FIG. 5. Furthermore, in step S1000 illustrated in FIG. 5, the CPU 201 can receive, as well as the print job, information for identifying an apparatus that has transmitted the print job and an application that has been used to issue a printing instruction. In this case, the CPU 201 can determine whether borderless printing is set based on the type of the apparatus or application identified by the received information. For example, the CPU 201 can determine that borderless printing is set in a case where printing paper on which a photograph is often printed as a print target image is set as one of the print settings, such as a case where the size of printing paper is "Photo L" or "Photo 2L" or a case where the type of printing paper is "glossy paper".

If the CPU 201 determines that borderless printing is not set (NO in step S1203), the processing proceeds to step S1204. In step S1204, the CPU 201 acquires the smallest paper width from respective paper widths of the candidate printing paper sizes included in the candidate paper size group, and stores, in a predetermined area of the work memory 205, the smallest paper width as the width of a layout region on which a print target image is to be rasterized (a layout width). For example, in a case where the candidate paper size group includes A4 size (paper width: 210.0 mm, paper length: 297.0 mm) and Letter size (paper width: 215.9 mm, paper length: 279.4 mm), in step S1204, the CPU 201 acquires the paper width "210.0 mm" of A4 size. In step S1205, the CPU 201 acquires the smallest paper length from respective paper lengths of the candidate printing paper sizes included in the candidate paper size group, and stores, in a predetermined area of the work memory 205, the smallest paper length as a layout length. In the above-described example, the CPU 201 acquires the paper length "279.4 mm" of Letter size.

On the other hand, if the CPU 201 determines that borderless printing is set (YES in step S1203), the processing proceeds to step S1206. In step S1206, the CPU 201 acquires the largest paper width from the candidate paper size group, and stores, in a predetermined area of the work memory 205, the largest paper width as a layout width. In a case where the candidate paper size group includes A4 size and Letter size, the CPU 201 acquires the paper width "215.9 mm" of Letter size. In step S1207, the CPU 201 acquires the largest paper length from the candidate paper size group, and stores, in a predetermined area of the work memory 205, the largest paper length as the length of a layout region on which a print target image is to be rasterized (a layout length). In the above-described example, the CPU 201 acquires the paper length "297.0 mm" of A4 size.

In the above-described processing in steps S1206 and S1207, the CPU 201 acquires the largest width and the largest length from among all of the candidate printing paper sizes included in the candidate paper size group and determines the largest width and the largest length as a layout width and a layout length. However, depending on the configuration of the platen 111 of the printing apparatus 100 or the type and intended use of printing paper, the candidate paper size group may include a paper size or paper sizes that do not support borderless printing. In such a case, in the layout determination process for borderless printing performed in steps S1206 and S1207, the CPU 201 can acquire the largest width and the largest length from a limited range of paper sizes that support borderless printing among the candidate paper size group.

After the CPU 201 determines the largest width and the largest length in the process performed in steps S1203 to S1207, the processing proceeds to step S1209.

In step S1209, the CPU 201 enlarges or reduces a print target image, which corresponds to the print job received in step S1000 illustrated in FIG. 5, in such a way as to fit the layout width and the layout length stored in the work memory 205, and rasterizes the enlarged or reduced print target image on the image memory 206 of the data memory 204.

Incidentally, in step S1209, in a case where a print target image is included in the print job, the CPU 201 rasterizes the print target image on the image memory 206. In a case where text data or vector data is included in the print job, or in a case where a structured document, such as a HyperText Markup Language (HTML) document, is targeted for printing, the CPU 201 performs rendering on such data to rasterize a print target image on the image memory 206. Moreover, in a case where a Uniform Resource Locator (URL) or file path information for identifying a storage location of print target data is included in the print job, the CPU 201 acquires the print target data from an external server or an internal or external memory according to such information. Then, the CPU 201 rasterizes a print target image on the image memory 206 based on the print target data.

If the CPU 201 determines that the set paper size is included in the candidate paper sizes (group) (YES in step S1201) or if the CPU 201 determines that only one candidate paper size is present (YES in step S1202), the processing proceeds to step S1208.

In step S1208, the CPU 201 sets the width of a layout region on which a print image is to be rasterized (a layout width) and the length of the layout region (a layout length) according to the width, length, and margin setting of the set paper size, and stores the layout width and the layout length in a predetermined area of the work memory 205. Then, the processing proceeds to step S1209.

In step S1209, as described above, the CPU 201 enlarges or reduces a print target image in such a way as to fit the width and length of the layout region determined in step S1208, and rasterizes the enlarged or reduced print target image on the image memory 206.

As described above, if, in step S1201, the CPU 201 determines that the set paper size is included in the candidate paper sizes (group), then in step S1208, the CPU 201 determines the width and length of the layout region, on which a print target image is to be rasterized, according to the set paper size.

Accordingly, for example, in a case where the user specifies a desired size as a printing paper size via an apparatus that transmits a print job, the CPU 201 can rasterize an image onto a layout region with a size corresponding to the specified size to print the rasterized image.

In addition, in a case where the set paper size is not included in the candidate paper sizes (group) or a plurality of candidate paper sizes is present, then in steps S1203 to S1207, the CPU 201 determines the width and length of the layout region according to the presence or absence of borderless printing setting.

In the process performed in steps S1204 and S1205, if a plurality of candidate printing paper sizes is present and borderless printing is not specified (NO in step S1203), the CPU 201 acquires the smallest paper width and the smallest paper length from among respective paper widths and paper lengths of the plurality of candidate printing paper sizes. Then, in step S1209, the CPU 201 scales a print target image in such a way as to fit the size of a rasterization region obtained by excluding respective margins from the smallest paper width and the smallest paper length. Then, since a print target image the width and length of which are smaller than the paper width and paper length of printing paper is generated regardless of whichever of a plurality of candidate paper sizes the printing paper used for the printing apparatus 100 is, the entire print target image can be printed on the printing paper.

Also, in the process performed in steps S1206 and S1207, if a plurality of candidate printing paper sizes is present and borderless printing is specified (YES in step S1203), the CPU 201 acquires the largest paper width and the largest paper length from among respective paper widths and paper lengths of the plurality of candidate printing paper sizes. Then, in step S1209, the CPU 201 scales a print target image in such a way as to fit the size of a rasterization region obtained by enlarging the largest paper width and the largest paper length at a borderless enlargement ratio. Then, since a print target image the width and length of which are larger than the paper width and paper length of printing paper is generated regardless of whichever of a plurality of candidate paper sizes the printing paper used for the printing apparatus 100 is, borderless printing in which no margins are present on printing paper can be performed as borderless printing setting.

As described above, according to the processing illustrated in FIG. 6A, in a case where the set paper size specified by the user to be used for printing is greatly different from the size of printing paper actually used for printing, the width and length of the layout region are determined based on the candidate paper size group. Thus, for example, in a case where the user specifies, as the set paper size, a size greatly different from the size of printing paper actually used for printing or in a case where printing paper greatly different in size from the set paper size is stored in the printing apparatus 100, the process in steps S1203 to S1207 is performed. Accordingly, images of appropriate sizes corresponding to the size of printing paper actually used for printing and the specification of borderless printing can be printed on the printing paper.

Next, another example of the fitting process in step S1006 illustrated in FIG. 5 is described with reference to FIG. 6B.

In the process illustrated in FIG. 6A, in a case where the set paper size is identified and the set paper size is not included in the candidate paper sizes (group), the CPU 201 determines the size of the layout region based on the candidate paper sizes (group). On the other hand, in the process illustrated in FIG. 6B, in a case where the set paper size is identified and the set paper size is not included in the candidate paper sizes (group), the CPU 201 issues an error notification to the user, thus preventing printing from being performed. Steps S1200 to S1202, S1208, and S1209 in FIG. 6B are similar to those described in the description of FIG. 6A, and the detailed description thereof is, therefore, not repeated.

In step S1200, the CPU 201 determines whether the set paper size has been identified in step S1001. If the CPU 201 determines that the set paper size has been identified in step S1001 (YES in step S1200), the processing proceeds to step S1201. If the CPU 201 determines that the set paper size has not been identified (NO in step S1200), the processing proceeds to step S1202.

In step S1201, the CPU 201 determines whether the set paper size is included in the candidate paper sizes (group). If the CPU 201 determines that the set paper size is included in the candidate paper size group (YES in step S1201), the processing proceeds to step S1208. In step S1208, the CPU 201 sets a layout width and a layout length according to the set paper size. Then, in step S1209, the CPU 201 rasterizes a print target image on a layout region with the layout width and the layout length set in step S1208. Then, the processing proceeds to step S1008 for performing printing illustrated in FIG. 5.

On the other hand, if the CPU 201 determines that the set paper size is not included in the candidate paper size group (NO in step S1201), the processing proceeds to step S1210. At this time, printing paper used for printing has been conveyed up to the position below the paper sensor 118 illustrated in FIG. 1 to detect the width of the printing paper via the paper sensor 118 in step S1003 illustrated in FIG. 5. In step S1210, to cancel the printing (printing based on the print job received in step S1000 in FIG. 5), the CPU 201 controls the conveyance motor 210 to discharge the printing paper to the discharge tray 117 without performing printing via the print head 112.

In step S1211, the CPU 201 issues, to the user, an error notification indicating that the printing has been canceled. For example, the CPU 201 controls the panel control unit 217 to provide, on the operation panel 218, a display indicating that the set paper size is different from the size of printing paper conveyed in the printing apparatus 100. At this time, the CPU 201 can display both or one of the set paper size and the candidate paper sizes (group) to allow the user to correct both or one of the set paper size and the size of printing paper used for printing by the printing apparatus 100 and to issue an instruction for printing again. Furthermore, the method for issuing the error notification is not limited to displaying, but may be outputting of warning sound or a speech indicating the content of warning.

After the error notification is completed in step S1211, the processing ends. At this time, since the processing does not proceed to step S1008 illustrated in FIG. 5, the printing process is canceled.

If the CPU 201 determines that the set paper size has not been identified in step S1001 illustrated in FIG. 5 (NO in step S1200), the processing proceeds to step S1202. In step S1202, the CPU 201 determines whether only one candidate paper size is present.

If the CPU 201 determines that only one candidate paper size is present (YES in step S1202), the processing proceeds to step S1213. On the other hand, if the CPU 201 determines that a plurality of candidate paper sizes is present (NO in step S1202), the processing proceeds to step S1212.

In step S1212, the CPU 201 narrows down the plurality of candidate paper sizes to a candidate paper size used for determining the size of a layout region on which a print target image is to be rasterized. Various conditions can be used to narrow down the plurality of candidate paper sizes. The usable conditions include, for example, the type of printing paper or destination information of the printing apparatus 100. The type of printing paper is specified, for example, by an instruction from the user in an apparatus that transmits a print job. Type information indicating the specified type is included in the print setting information. In step S1001, the CPU 201 acquires the type information and identifies the type of printing paper. "Envelope", "Postcard", or the like is specified as the type of printing paper, and print processing is performed according to the specified type. For example, in a case where the plurality of candidate paper sizes is "Postcard" and "Photo 4×6" and the type of printing paper is "Postcard", the CPU 201 narrows down the plurality of candidate paper sizes to a candidate paper size "Postcard", since "Postcard" is a more appropriate paper size than "Photo 4×6".

The "destination information" indicates a country or region to which the printing apparatus 100 is shipped or in which the printing apparatus 100 is sold. The destination information is stored in the program memory 203. The CPU 201 can refer to the destination information to discriminate a country or region in which the printing apparatus 100 is used. For example, in a case where the candidate paper sizes are "A4" and "Letter" and the destination information is "Japan", since A4 size is more often used in Japan than Letter size, the CPU 201 can narrow down to "A4". The destination information is not limited to the above-mentioned information indicating a country or region in which the printing apparatus 100 is sold, but may be, for example, information for language setting. The printing apparatus 100 has settings for languages to be used for displaying notifications and guidance to users. The CPU 201 can identify a country or region in which the printing apparatus 100 is used based on the language setting information.

Furthermore, various conditions, such as the type of printing paper and the destination information, can be combined to be used for narrowing down. For example, in a case where candidate paper sizes cannot be narrowed down based on the type of printing paper, the CPU 201 can further perform narrowing down based on the destination information. For example, in a case where the candidate paper sizes are "Photo 4×6", "Envelope Chou #3", and "Photo 2L" and the type of printing paper is "others" other than "Envelope" and "Postcard", "Envelope Chou #3", which corresponds to "Envelope", is excluded, but "Photo 4×6" and "Photo 2L" remain as candidate paper sizes. Then, the CPU 201 refers to the destination information. When the destination information indicates "the United States", since "Photo 4×6" is more often used in the United States than "Photo 2L", the CPU 201 can narrow down to "Photo 4×6".

After narrowing down of the plurality of candidate paper sizes in step S1212 is completed, the processing proceeds to step S1213.

In step S1213, the CPU 201 sets the layout width and the layout length of a layout region, on which a print target image is to be rasterized, according to the candidate paper size. Then, in step S1209, the CPU 201 rasterizes the print target image onto the layout region, the size of which has been determined in step S1213.

Figure 6B:
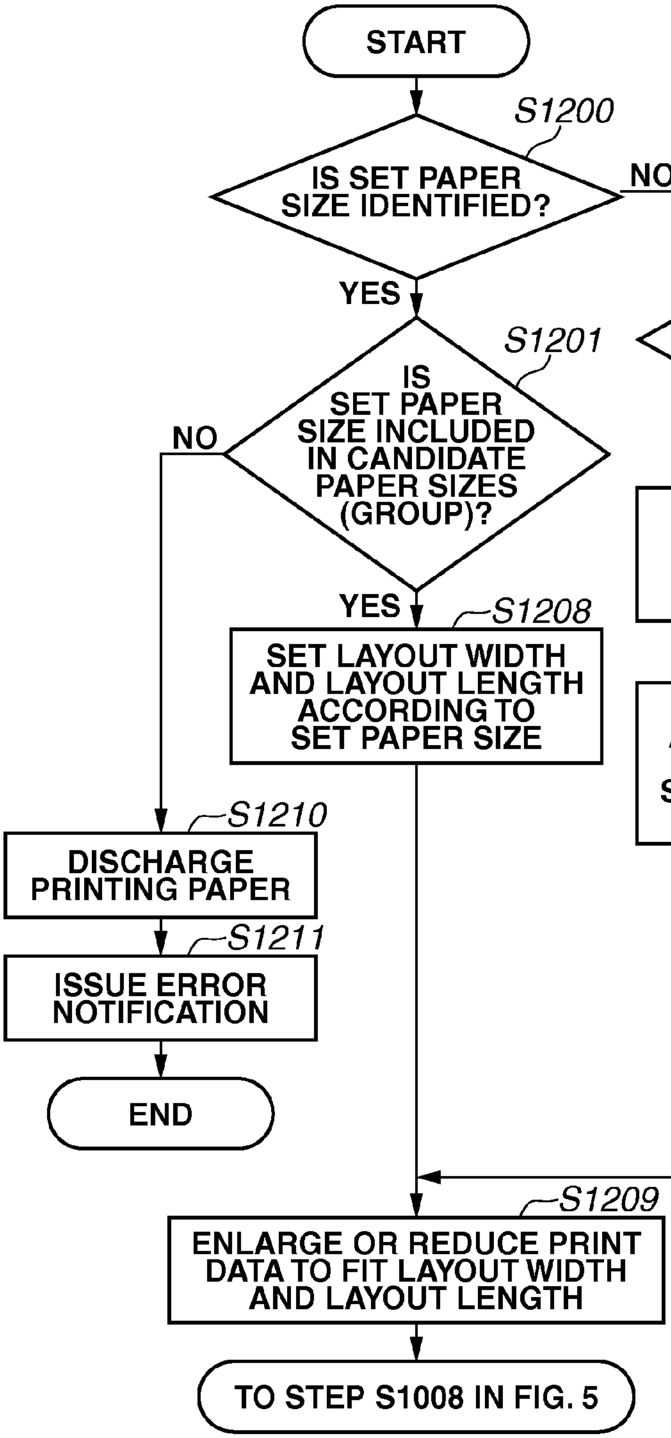

As described above, according to the processing illustrated in FIG. 6B, for example, in a case where the user specifies a desired printing paper size via an apparatus that transmits a print job, in step S1201, the CPU 201 determines whether the specified size corresponds to the size of printing paper actually used for printing. Then, if it is determined that the size specified by the user corresponds to the size of printing paper actually used for printing (YES in step S1201), the CPU 201 can cause an image corresponding to the specified size to be printed on the printing paper.

On the other hand, if it is determined that the size specified by the user does not correspond to the size of printing paper actually used for printing (NO in step S1201), the CPU 201 performs the process in steps S1210 and S1211 to cancel the printing. Therefore, in a case where the user has erroneously specified a size that is greatly different from the size of printing paper actually used for printing or in a case where printing paper the size of which is greatly different from the size specified by the user has been conveyed, the CPU 201 can prevent the printing from being performed.

The method for limiting printing is not limited to the method for canceling printing, but may be a method for issuing an error notification in step S1211 without discharging paper and for performing printing when the user issues an instruction for performing printing in response to the error notification. In this case, if the user issues an instruction for canceling printing in response to the error notification, the CPU 201 discharges printing paper in step S1210 to cancel the printing.

Furthermore, if the set paper size is not identified and a plurality of candidate paper sizes is present (NO in step S1200 and NO in step S1202), the CPU 201 narrows down the candidate paper sizes with the above-described various conditions. Therefore, in a case where the user does not specify the size of printing paper or in a case where an application that does not specify the size of printing paper issues a print job, an image with an appropriate size corresponding to the size of printing paper actually used for printing can be printed on the printing paper.

In addition, the CPU 201 can determine whether to cancel printing not only based on an instruction from the user but also according to various conditions. The various conditions can include the type of printing paper that is set in the print setting information. For example, in a case where the type of printing paper is photo paper (glossy paper or coated paper), the CPU 201 can perform a cancel operation. In a case where the type of printing paper is plain paper, the CPU 201 can perform printing according to the set paper size or the candidate paper size without performing the cancel operation. Accordingly, if printing is likely to be performed on relatively costly printing paper, such as glossy paper, the CPU 201 can prevent an image with a size inappropriate for the size of that paper from being printed. Moreover, for example, before the user causes a photographic image to be printed on printing paper of Photo L size, the user may want to confirm a printed result by causing printing to be performed on plain paper of A4 size while specifying "Photo L" as the set paper size. With the above-described configuration employed, even if the set paper size is different from the candidate paper size as in the above case, printing can be performed if the paper type is plain paper, so that the printing intended by the user can be implemented.

FIGS. 7A, 7B, 7C, 7D, 7E, and 7F illustrate various relationships between the size of a layout region and the size of printing paper when printing is performed according to the process illustrated in FIG. 6A or 6B. In FIGS. 7A to 7F, a case where the candidate paper size is "A4" or "Letter" is described. As mentioned above, A4 size and Letter size have such a relationship that Letter size is slightly larger in paper width and A4 size is slightly larger in paper length.

Figure 7A:
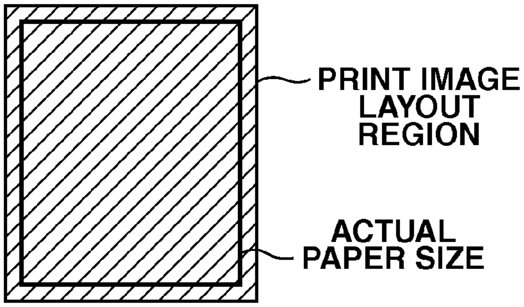
FIGS. 7A, 7B, 7C, 7D, 7E, and 7F illustrate various relationships between the size of a layout region and the size of printing paper when printing is performed according to the process illustrated in FIG. 6A or 6B.
Figure 7B:
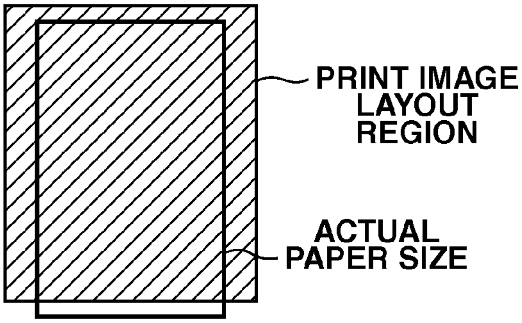
Figure 7C:
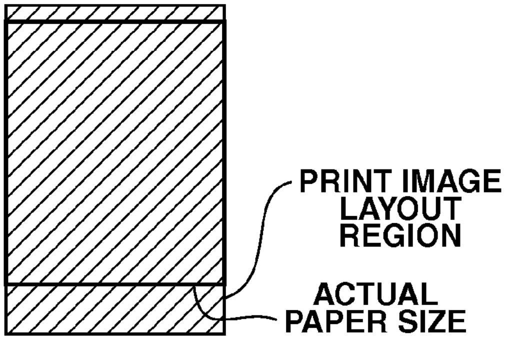
Figure 7D:
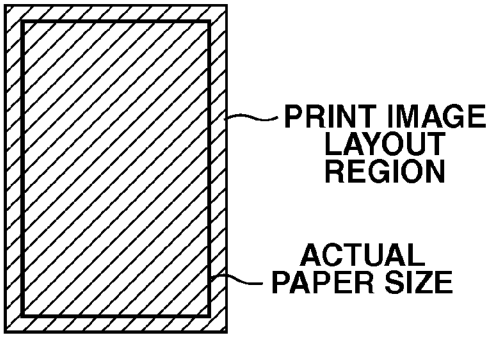

For example, in a case where Letter size is set as the set paper size, when printing paper actually used for printing is Letter size or A4 size, a hatched portion illustrated in FIG. 7A or 7B, respectively, is set as a layout size. Also, for example, in a case where A4 size is set as the set paper size, when printing paper actually used for printing is Letter size or A4 size, a hatched region illustrated in FIG. 7C or 7D, respectively, is set as a layout size.

According to the processing illustrated in FIG. 6B, in a case where the set paper size is neither A4 size nor Letter size, printing is canceled. Therefore, for example, in a case where the user erroneously specifies Photo L size, which is greatly different from A4 size and Letter size, printing is canceled. Accordingly, it is possible to prevent printing from being performed with an image rasterized to a layout region corresponding to Photo L size, which is small compared to printing paper actually used for printing. Also, it is possible to prevent printing from being performed on printing paper, such as A4 size or Letter size, that is large compared to an image corresponding to Photo L size in spite of the user specifying the set paper size "Photo L" in a print job in which printing is to be performed originally on printing paper of Photo L size.

Furthermore, according to the processing illustrated in FIG. 6A, in a case where a plurality of candidate paper sizes is present and borderless printing is specified, even if printing paper used for printing is either one of the plurality of candidate paper sizes, a print target image the width and length of which are larger than the paper width and paper length of the printing paper is generated. Accordingly, printing can be performed without any margins in the printing paper as in the specified borderless printing.

Figure 7E:
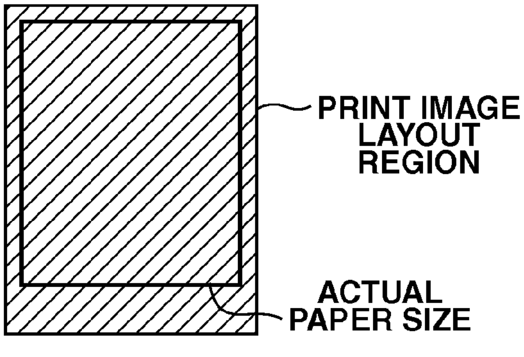
Figure 7F:
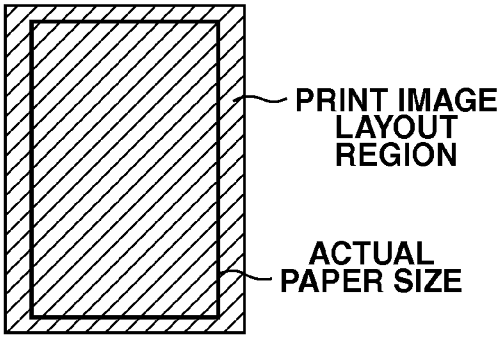

FIGS. 7E and 7F each illustrate a relationship between a layout region and printing paper in a case where the candidate paper sizes are A4 size and Letter size and the settings for A4 size and borderless printing are specified. FIGS. 7E and 7F illustrate cases where printing paper of Letter size and printing paper of A4 size are used for printing, respectively. a hatched region illustrated in each of FIGS. 7E and 7F is set as a layout region.

As illustrated in FIGS. 7E and 7F, even if printing paper actually used for printing is either A4 size or Letter size, a region the width and length of which are larger than those of the printing paper is set as the layout region. Thus, printing can be performed without any margins in the printing paper as in the specified borderless printing.

In the above-described exemplary embodiment, an example has been described in which when receiving a print job from an external apparatus, the printing apparatus 100 determines the size of printing paper and performs printing according to the determined paper size. However, this example is not a restrictive one. The present exemplary embodiment can apply to a case where the printing apparatus 100 determines paper size in a copy function in which an image read by the scanner 220 included in the printing apparatus 100 is printed on printing paper.

Furthermore, in the above-described exemplary embodiment, an example has been described in which a print job is received from the smart device 208 connected via an interface. However, a print job can be received from a remote location connected via a telephone line or a network line. Although an example has been described in which an apparatus that issues a print job is the smart device 208, the apparatus may be, instead of the smart device 208, a mobile phone, a host computer, or a digital television set. Moreover, the printing apparatus 100 may receive a print job not only directly from an apparatus operable by the user but also via an intermediate apparatus, such as a print server or a cloud service.

Figure 8:
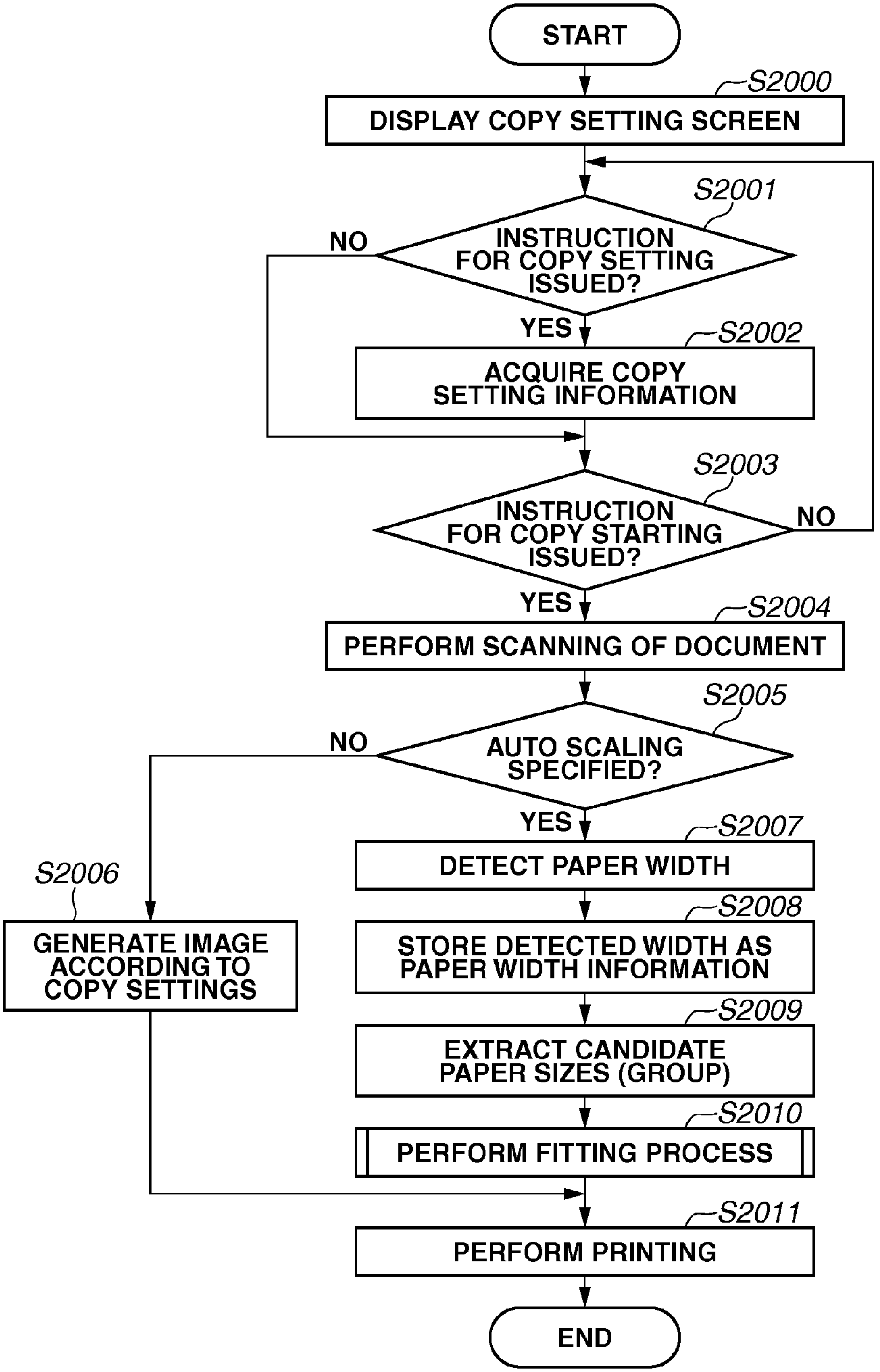
FIG. 8 is a flowchart illustrating an example of print control processing for a copy function.

FIG. 8 is a flowchart illustrating an example of print control processing for a copy function. The processing illustrated in the flowchart of FIG. 8 is executed by the CPU 201 similar to the processing illustrated in FIG. 5. Also, the processing illustrated in the flowchart of FIG. 8 is executed when the user selects the copy function via the operation panel 218 of the printing apparatus 100 and an instruction for performing the copy function is input to the CPU 201.

In step S2000, the CPU 201 causes the panel control unit 217 to display, on a display panel of the operation panel 218, a setting screen used for the user to specify a copy setting and a copy start instruction in the copy function. The contents settable via the copy setting screen include settings in the copy function, such as paper size of printing paper used for printing, the number of copies to be printed, a margin setting, and a print intensity. The margin setting includes setting of "borderless copy" indicating whether to provide margins (borders) in printing paper to be used for copying, and setting of the widths of margins when borderless copy is not specified. Copy setting information indicating default copy settings is stored in the program memory 203, and the CPU 201 reads out the copy setting information to the data memory 204 and causes the default copy settings to be displayed on the copy setting screen. The user can change the default settings to specify the copy setting.

The above-mentioned copy setting includes a scaling setting about scaling (enlargement or reduction) of a scanned image read by the scanner 220. For example, in a case where "equal size setting" is specified, the scanned image is printed without being scaled. Also, in a case where the user specifies magnification, the scanned image is scaled at the specified magnification. Moreover, in a case where "auto scaling" is specified, scaling (fitting process) is performed in such a way as to fit paper stored in the printing apparatus 100.

In step S2001, the CPU 201 determines whether the user has issued an instruction for the copy setting. If the CPU 201 determines that the user has issued an instruction for the copy setting (YES in step S2001), the processing proceeds to step S2002. If the CPU 201 determines that the user has not issued an instruction for the copy setting (NO in step S2001), the processing proceeds to step S2003.

In step S2002, the CPU 201 acquires, via the panel control unit 217, the copy setting information, which indicates the copy setting specified by the user via the operation panel 218. Thus, in step S2002, the CPU 201 rewrites the copy setting information stored in the data memory 204 with the copy setting information specified by the user. In step S2003, the CPU 201 determines whether the copy start instruction has been issued by the user. If the CPU 201 determines that the copy start instruction has been issued (YES in step S2003), the processing proceeds to step S2004. If the CPU 201 determines that the copy start instruction has not been issued (NO in step S2003), the processing returns to step S2001. In step S2004, the CPU 201 causes the scanner 220 via the scanner control unit 219 to read a document.

In step S2005, the CPU 201 determines whether "auto scaling" is specified in the copy setting information stored in the data memory 204. If the CPU 201 determines that "auto scaling" is not specified (NO in step S2005), then in step S2006, the CPU 201 generates a print target image on the image memory 206 according to the scaling setting in the copy setting information.

On the other hand, if the CPU 201 determines that "auto scaling" is specified (YES in step S2005), the processing in steps S2007 to S2010 is executed. In steps S2007 to S2010, the CPU 201 determines the size of printing paper conveyed in the printing apparatus 100 and then scales the scanned image, obtained by reading in step S2004, according to the determined paper size. The processing in steps S2007 to S2010 is similar to the above-described processing in steps S1003 to S1006 with reference to FIG. 5, and the detailed description thereof is, therefore, not repeated.

In step S2011, the CPU 201 outputs, to the head control unit 213, the print target image generated on the image memory 206 in steps S2006 or S2010. Then, the CPU 201 drives the print head 112 and the carriage 113 to print the print target image on the printing paper.

As described above, in the processing illustrated in FIG. 8, in a case where the scaling setting in the copy setting information is "auto scaling", an image with a size corresponding to the size of printing paper conveyed in the printing apparatus 100, determined via the paper sensor 118, can be printed on the printing paper.

According to the above-described exemplary embodiment, for example, in a case where the user specifies a desired printing paper size via an apparatus that transmits a print job, it is determined whether the specified size corresponds to the size of printing paper actually used for printing. If it is determined that the size specified by the user corresponds to the size of printing paper actually used for printing, an image with a size corresponding to the specified size can be printed on the printing paper.

On the other hand, if it is determined that the size specified by the user does not correspond to the size of printing paper actually used for printing, an image with a size corresponding to the candidate paper size can be printed on the printing paper (FIG. 6A) or the printing is canceled (FIG. 6B).

Accordingly, for example, if the user erroneously specifies a size that is greatly different from the size of printing paper used for printing, or if printing paper with a size that is greatly different from the size specified by the user is conveyed, the printing apparatus 100 can perform appropriate processing. More specifically, in such a case, the printing apparatus 100 can prevent an image with a size that is greatly different from the size of printing paper from being printed.

Furthermore, in a case where the set paper size is not identified, printing is performed according to the candidate print medium size determined based on the paper width detected by the paper sensor 118. Therefore, in a case where the user does not specify the size of printing paper or in a case where an application that does not specify the size of printing paper issues a print job, an image with an appropriate size corresponding to the size of printing paper actually used for printing can be printed on the printing paper.

The "set paper size" described in the above-described exemplary embodiment is not limited to the one specified by the user via an apparatus that transmits a print job. For example, the set paper size can be set to the printing apparatus 100 by the user via the operation panel 218 of the printing apparatus 100. Moreover, the "set paper size" is not limited to the one specified by the user, but may be the one automatically set according to various conditions, such as the type of an apparatus that transmits a print job, an application, and a print mode in the printing apparatus 100.

Furthermore, in the above-described exemplary embodiment, an example has been described in which the size of printing paper is determined based on a result of detection by the paper sensor 118 when printing is performed based on a print job received from an external apparatus located outside the printing apparatus 100 or when the copy function is executed in the printing apparatus 100. However, this is not a restrictive one. For example, when an image stored in the memory card 223 attached to the memory card slot 222 is printed according to the print settings set by the user via the operation panel 218, the above-described processing for determining the size of printing paper can be executed. For example, in a case where any paper size is not specified in the print setting information indicating the print settings specified by the user, the above-described processing for determining the size of printing paper can be executed. The case where any paper size is not specified in the print setting information includes a case where no paper size is included in the print setting information and a case where an instruction for executing processing for setting the paper size according to a result of detection by the paper sensor 118 is included in the print setting information.

Furthermore, the present exemplary embodiment can apply to a case where, when printing is performed according to the print settings specified by the user via the printing apparatus 100, an image stored in an internal memory included in the printing apparatus 100 instead of an external memory, such as the memory card 223, is printed. Moreover, the present exemplary embodiment can apply to a case where an image stored in an external apparatus, such as a server, connected to the printing apparatus 100 via a network is printed according to the print settings specified by the user via the operation panel 218 of the printing apparatus 100.

In addition, in the above-described exemplary embodiment, a case has been described in which the paper sensor 118 of the printing apparatus 100 detects the width of printing paper. This is not a restrictive one. The present exemplary embodiment can apply to a case where the length of printing paper is detected by a sensor or a case where both the width and length of printing paper are detected. In either detection method, in a case where a plurality of candidate paper sizes is present as the size of printing paper used in the printing apparatus 100, an appropriate paper size can be determined according to the processing described in the present exemplary embodiment.

Furthermore, the present exemplary embodiment is not limited to a case where the size of printing paper is automatically determined by a sensor. For example, the user can specify, via an operation panel of the printing apparatus, the size of printing paper stored in a cassette in the printing apparatus or the size of printing paper inserted by the user into a paper feed port of the printing apparatus. Then, the size specified by the user can be applied as the size of printing paper automatically determined by the sensor in the above-described exemplary embodiment, so that the processing according to the above-described exemplary embodiment can be executed.

In addition, the timing at which the user specifies the size of printing paper may be arbitrary. For example, a sensor for detecting opening and closing of a cassette in the printing apparatus or a sensor for detecting whether printing paper is present on the paper feed port is mounted in the printing apparatus. Then, when the sensor detects that the cassette is opened and then closed or that printing paper is inserted into the paper feed port, a screen usable for the user to specify the size or type of the printing paper is displayed on the operation panel of the printing apparatus. Then, the size specified by the user via the screen can be used as the size determined by the sensor in the above-described exemplary embodiment.

Furthermore, in the above-described exemplary embodiment, a case has been described in which the CPU 201 included in the printing apparatus 100 executes, as an information processing apparatus, the processing for determining the paper size illustrated in FIGS. 6A and 6B. However, this is not a restrictive one. For example, the present exemplary embodiment can apply to a case where an information processing apparatus, such as a host computer or a server, connected to the printing apparatus 100 and configured to cause the printing apparatus to perform printing serves as a print control apparatus according to the present exemplary embodiment to execute the processing described in the present exemplary embodiment.

More specifically, a host computer, a server, or a smart device executes the processing in steps S1001 to S1007 illustrated in FIG. 5 when transmitting a print job to the printing apparatus 100. Thus, the host computer, the server, or the smart device, when transmitting a print job to the printing apparatus 100, acquires information about the paper width of printing paper detected by the paper sensor 118 of the printing apparatus 100. Then, the host computer, the server, or the smart device specifies a candidate printing paper size according to the paper width indicated by the acquired information, and determines a layout region based on the specified candidate printing paper size and the set paper size. Then, the host computer, the server, or the smart device rasterizes a print target image onto the layout region on a memory included in the host computer, the server, or the smart device, and transmits the rasterized image as a print job to the printing apparatus 100, thus causing the printing apparatus 100 to perform printing. More specifically, under the control of the CPU 201 of the printing apparatus 100, a printing mechanism included in the printing apparatus 100 prints the image received from the host computer, the server, or the smart device on printing paper.

In the above-described configuration, when printing is canceled in steps S1210 and S1211 illustrated in FIG. 6B, the host computer, the server, or the smart device issues an error notification. More specifically, the host computer, the server, or the smart device provides a display indicating that printing has been canceled or a display for allowing the user to confirm both or one of the size of printing paper set in the printing apparatus 100 and the set paper size. In a case where the host computer issues an error notification, such a display is performed on a display device included in the host computer or on an external display device connected to the host computer. In a case where the server issues an error notification, the server notifies a client apparatus that has transmitted a print job to the server of the content of the error notification, so that an error display is performed on an internal display device or an external display device of the client apparatus.

Furthermore, as another example of a case where the processing in the present exemplary embodiment is executed in the host computer, the server, or the smart device, such an apparatus can perform up to the determination of the size of a layout region in steps S1205, S1207, S1208, and S1213 illustrated in FIGS. 6A and 6B. In this case, scaling of a print target image in step S1209 is performed by the CPU 201 of the printing apparatus 100. Sharing of processing between the printing apparatus 100 and the host computer, the server, or the smart device can be configured in various other manners in the present exemplary embodiment.

In addition, in the above-described exemplary embodiment, a case has been described in which an example of a print medium on which an image is to be printed by the printing apparatus is printing paper. However, this is not a restrictive one. The print medium may be an overhead projection (OHP) sheet. Moreover, the print medium is not limited to a rectangular print medium, such as the above-mentioned printing paper, but may be a disc-shaped recording medium, such as a compact disc (CD) or a digital versatile disc (DVD).

Embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Furthermore, computer executable instructions for implementing the functions of the above-described exemplary embodiment can be executed by a single computer (CPU or MPU) or can be cooperatively executed by a plurality of computers. Moreover, not only the computer executable instructions can be executed by a computer or computers, but also hardware, such as a circuitry, for implementing the functions of the computer executable instructions can be provided. In addition, parts of the computer executable instructions can be implemented by hardware and other parts thereof can be executed by a computer or computers.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and function.

This application claims the benefit of Japanese Patent Application No. 2013-137041 filed Jun. 28, 2013, which is hereby incorporated by reference herein in its entirety.

What is claimed is:

1. A printing apparatus comprising:

a processor; and a printing unit configured to print an image based on print target data received from an external device, wherein the processor acquires a detection result obtained by a sensor detecting at least one of a width and a length of a print medium which has been set in the printing unit and, if a print medium size is not set at the external device by a user as a print setting for the print target data, the printing unit prints an image having a size corresponding to the detection result, based on the print target data, and, if the print medium size is set at the external device by a user as the print setting and the print medium size does not correspond to a predetermined size which is based on the detection result, the printing unit does not print an image on the print medium based on the print target data, and, if the print medium size is set at the external device by a user as the print setting and the print medium size corresponds to the predetermined size, the printing unit prints an image having a size corresponding to the print medium size on the print medium, based on the print target data.

2. The apparatus according to claim 1, further comprising a notification unit configured to, if the printing unit does not print an image on the print medium based on the print target data, issue a notification that an image is not printed.

3. The apparatus according to claim 2, wherein the printing unit prints an image based on the print target data, on the print medium, in a case where a print instruction is input from a user after the notification is issued by the notification unit.

4. The apparatus according to claim 1, wherein the processor determines a size of the print medium based on the detection result;

wherein, the determined size is the predetermined size.

5. The apparatus according to claim 1, wherein, if the print medium size is not set at the external device by a user as the print setting and the detection result corresponds to a plurality of candidate sizes of the print medium, the processor determines any one of the plurality of candidate sizes according to a predetermined condition, wherein the printing unit prints an image having a size corresponding to the determined candidate size.

6. The apparatus according to claim 5, wherein the processor uses, as the predetermined condition, at least one of destination information of the apparatus and a print medium type set for the print target data to determine any one of the plurality of candidate sizes.

7. The apparatus according to claim 1, wherein, if the print medium size is not set at the external device by a user as the print setting and the detection result corresponds to a plurality of candidate sizes of the print medium, the printing unit prints an image having a size determined based on the plurality of candidate sizes and a margin setting for setting an amount of margin provided for a print medium used for printing the print target data.

8. The apparatus according to claim 7, wherein the processor individually selects a width and a length each corresponding to the margin setting from among widths and lengths in the plurality of candidate sizes, and the printing unit prints an image with a size determined based on the selected width and the selected length.

9. The apparatus according to claim 7, wherein the margin setting includes information for setting whether to provide a margin for a print medium in printing.

10. The apparatus according to claim 9, wherein, if the margin setting indicates no margin provided for a print medium, the printing unit prints an image having a size larger than any of the plurality of candidate sizes.

11. The apparatus according to claim 1, wherein the printing unit conveys a print medium to a position corresponding to a print head and performs printing on the conveyed print medium via the print head, and wherein the sensor is located at the position corresponding to the print head and detects a width of the print medium when the print medium has been conveyed.

12. The apparatus according to claim 11, wherein the predetermined size is a size having the detected width of the print medium.

13. The apparatus according to claim 1, further comprising a wireless interface configured to receive the print target data from the external apparatus, via a wireless communication, and wherein the printing unit prints an image, by causing a print head to discharge ink.

14. A method for controlling a printing apparatus, the method comprising:

acquiring a detection result obtained by a sensor detecting at least one of a width and a length of a print medium which has been set in a printing unit of the printing apparatus;

causing the printing unit to print an image based on print target data received from an external device, having a size corresponding to the acquired detection result if a print medium size is not set at the external device by a user as a print setting for the print target data, and not causing the printing unit to print an image on the print medium based on the print target data if the print medium size is set at the external device by a user as the print setting and the print medium size does not correspond to a predetermined size which is based on the acquired detection result, and causing the printing unit to print an image having a size corresponding to the medium size on the print medium, based on the print target data, if the print medium size is set at the external device by a user as the print setting and the print medium size corresponds to the predetermined size.

15. A printing apparatus comprising:

a display unit; and a printing unit configured to print an image based on print target data received from an external device, wherein the display unit displays a screen for a user to designate a size of a print medium, if a sensor detects opening or closing of a cassette for containing the print medium;

and, if a print medium size is not set at the external device by a user as a print setting for the print target data, the printing unit prints an image having a size corresponding to a designated size which is designated by the user on the screen based on the print target data, and, if the print medium size is set at the external device by a user as the print setting and the print medium size does not correspond to the designated size, the printing unit does not print an image on the print medium based on the print target data, and, if the print medium size is set at the external device by a user as the print setting and the print medium size corresponds to the designated size, the printing unit prints an image having a size corresponding to the print medium size on the print medium, based on the print target data.

16. The apparatus according to claim 15, wherein, if the printing unit does not print an image on the print medium based on the print target data, the display unit display a screen indicating that the print medium size does not correspond to the designated size.

17. The apparatus according to claim 15, further comprising a wireless interface configured to receive the print target data from the external apparatus, via a wireless communication, and wherein the printing unit prints an image, by causing a print head to discharge ink.

18. A method for controlling a printing apparatus configured to print an image based on print target data received from an external device, the method comprising:

displaying a screen for a user to designate a size of a print medium, if a sensor detects opening or closing of a cassette for containing the print medium; and causing the printing apparatus to print an image having a size corresponding to a designated size which is designated by the user in the displayed screen, based on the print target data if a print medium size is not set at the external device by a user as a print setting for print target data, and not causing the printing apparatus to print an image on the print medium based on the print target data if the print medium size is set at the external device by a user as the print setting and the print medium size does not correspond to the designated size, and causing the printing apparatus to print an image having a size corresponding to the print medium size on the print medium based on the print target data, if the print medium size is set at the external device by a user as the print setting and the print medium size corresponds to the designated size.

19. A printing apparatus comprising:

a display unit; and a printing unit configured to print an image based on print target data, wherein the display unit displays a screen for a user to designate a size of a print medium, if a sensor detects opening or closing of a cassette for containing the print medium, and wherein a processor determines a designated size which is designated by the users on the screen displayed by the display unit, as the size of the print medium, and wherein, if a print medium size set as a print setting for print target data corresponds to the designated size, the printing unit executes printing of the print target data, and, if the print medium size does not correspond to the designated size, the printing unit does not execute printing of the print target data.

20. The apparatus according to claim 19, further comprising a wireless interface configured to receive the print target data from the external apparatus, via a wireless communication, and wherein the printing unit prints an image, by causing a print head to discharge ink.

21. A method for controlling a printing apparatus, the method comprising:

displaying a screen for a user to designate a size of a print medium, if a sensor detects opening or closing of a cassette for containing the print medium;

determining a designated size which is designated by the user in the displayed screen, as the size of the print medium, and causing a printing device to execute printing of the print target data if a print medium size set as a print setting for print target data corresponds to the designated size, and, not causing the printing device to execute printing of the print target data if the print medium size does not correspond to the designated size.

22. A non-transitory computer-readable storage medium storing computer executable instructions that cause a computer to perform a method, the method comprising:

displaying a screen for a user to designate a size of a print medium, if a sensor detects opening or closing of a cassette for containing the print medium;

determining a designated size which is designated by the user in the displayed screen, as the size of the print medium, and causing a printing device to execute printing of the print target data if a print medium size set as a print setting for print target data corresponds to the designated size, and, not causing the printing device to execute printing of the print target data if the print medium size does not correspond to the designated size.

23. A printing system comprising:

a mobile device;

a printing apparatus which receives print target data from the mobile device via a wireless communication method and prints an image based on the print target data, wherein the printing apparatus acquires a detection result obtained by a sensor detecting at least one of a width and a length of a print medium which has been set in the printing apparatus, and wherein, if a print medium size is not set at the mobile device by a user as a print setting for the print target data, the printing apparatus prints an image having a size corresponding to the detection result based on the print target data, and, if the print medium size is set at the mobile device by a user as the print setting and the print medium size does not correspond to a predetermined size which is based on the detection result, the printing apparatus does not print an image on the print medium based on the print target data, and, if the print medium size is set at the mobile device by a user as the print setting and the print medium size corresponds to the predetermined size, the printing apparatus prints an image having a size corresponding to the print medium size on the print medium, based on the print target data.

24. A printing system comprising:

a mobile device;

a printing apparatus which receives print target data from the mobile device via a wireless communication method and prints an image based on the print target data, wherein the printing apparatus displays a screen for a user to designate a size of a print medium, if a sensor detects opening or closing of a cassette for containing the print medium;

and, if a print medium size is not set at the mobile device by a user as a print setting for the print target data, the printing apparatus prints an image having a size corresponding to a designated size which is designated by the user on the screen, based on the print target data, and, if the print medium size is set at the mobile device by a user as the print setting and the print medium size does not correspond to the designated size, the printing apparatus does not print an image on the print medium based on the print target data, and, if the print medium size of the print setting is set at the mobile device by a user as the print setting and the print medium size corresponds to the designated size, the printing apparatus prints an image having a size corresponding to the print medium size on the print medium based on the print target data.

* * * * *